United States Patent
Sullivan

(10) Patent No.: US 7,634,011 B2
(45) Date of Patent: Dec. 15, 2009

(54) APPLICATION PROGRAM INTERFACE (API) FACILITATING DECODER CONTROL OF ACCELERATOR RESOURCES

(75) Inventor: Gary J. Sullivan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1530 days.

(21) Appl. No.: 09/839,679

(22) Filed: Apr. 20, 2001

(65) Prior Publication Data
US 2002/0067369 A1 Jun. 6, 2002

Related U.S. Application Data

(60) Provisional application No. 60/198,938, filed on Apr. 21, 2000.

(51) Int. Cl.
H04N 7/12 (2006.01)
H04N 11/02 (2006.01)

(52) U.S. Cl. .................. 375/240.28; 375/240.25

(58) Field of Classification Search ..........................
375/240.01–240.07, 240.12–240.16, 240.25–240.26,
375/240.29; 348/384.1, 387.1, 390.1
See application file for complete search history.

(56) References Cited

U.S. PATENT DOCUMENTS

| | | | |
|---|---|---|---|
| 5,329,318 A * | 7/1994 | Keith ........................ 348/699 |
| 5,384,890 A | 1/1995 | Anderson et al. |
| 5,592,399 A | 1/1997 | Keith et al. |
| 5,784,649 A | 7/1998 | Begur et al. |
| 5,910,180 A | 6/1999 | Flory et al. |
| 5,961,632 A | 10/1999 | Shiell et al. |
| 6,002,441 A * | 12/1999 | Bheda et al. .......... 375/240.26 |
| 6,058,459 A | 5/2000 | Owen et al. |
| 6,179,489 B1 | 1/2001 | So et al. |
| 6,216,152 B1 | 4/2001 | Wong et al. |
| 6,223,193 B1 * | 4/2001 | Pau et al. .................... 708/300 |
| 6,225,923 B1 | 5/2001 | Andrews |
| 6,226,738 B1 | 5/2001 | Dowling |
| 6,252,917 B1 | 6/2001 | Freeman |
| 6,275,891 B1 | 8/2001 | Dao et al. |
| 6,278,478 B1 | 8/2001 | Ferriere |
| 6,289,396 B1 | 9/2001 | Keller et al. |
| 6,313,845 B1 | 11/2001 | Terry et al. |
| 6,348,925 B1 * | 2/2002 | Potu .......................... 345/537 |
| 6,369,855 B1 | 4/2002 | Chauvel et al. |
| 6,414,996 B1 * | 7/2002 | Owen et al. ............ 375/240.17 |
| 6,418,424 B1 | 7/2002 | Hoffberg et al. |
| 6,459,737 B1 | 10/2002 | Jiang |
| 6,490,324 B1 | 12/2002 | McDade et al. |
| 6,501,796 B1 | 12/2002 | Dusseux et al. |
| 6,501,798 B1 | 12/2002 | Sivan |
| 6,536,043 B1 | 3/2003 | Guedalia |
| 6,539,059 B1 * | 3/2003 | Sriram et al. .......... 375/240.25 |

(Continued)

OTHER PUBLICATIONS

Coulson et al. "A Distributed object platform infrastructure for multimedia applications" Elsevier Science 1998.

Primary Examiner—David Czekaj
(74) Attorney, Agent, or Firm—Lee & Hayes, PLLC

(57) ABSTRACT

A method comprising receiving a command from a decoder application at an application program interface (API), and generating a data structure, recognizable by a communicatively coupled accelerator including one or more parameters which, when received by the accelerator, affects one or more filter settings of the accelerator.

25 Claims, 8 Drawing Sheets

U.S. PATENT DOCUMENTS

| | | |
|---|---|---|
| 6,542,541 B1 | 4/2003 | Luna et al. |
| 6,567,117 B1 | 5/2003 | Nago et al. |
| 6,639,943 B1 | 10/2003 | Radha et al. |
| 6,658,477 B1 | 12/2003 | Lisitsa et al. |
| 6,668,324 B1 | 12/2003 | Mangold et al. |
| 6,687,806 B1 | 2/2004 | McGrath |
| 6,697,426 B1 | 2/2004 | Van Der Schaar et al. |
| 6,700,933 B1 | 3/2004 | Wu et al. |
| 6,725,279 B1 * | 4/2004 | Richter et al. ............... 719/313 |
| 6,728,317 B1 | 4/2004 | Demos |
| 6,731,811 B1 | 5/2004 | Rose |
| 6,744,472 B1 * | 6/2004 | MacInnis et al. ............ 348/441 |
| 6,823,016 B1 | 11/2004 | Nguyen et al. |
| 6,891,893 B2 | 5/2005 | Sullivan et al. |
| 7,072,366 B2 | 7/2006 | Parkkinen et al. |
| 7,181,603 B2 | 2/2007 | Rothrock et al. |
| 2002/0005903 A1 * | 1/2002 | Miyamoto et al. .......... 348/232 |
| 2002/0114395 A1 | 8/2002 | Owen et al. |
| 2002/0196853 A1 | 12/2002 | Liang et al. |
| 2005/0210117 A1 | 9/2005 | Wu et al. |

* cited by examiner

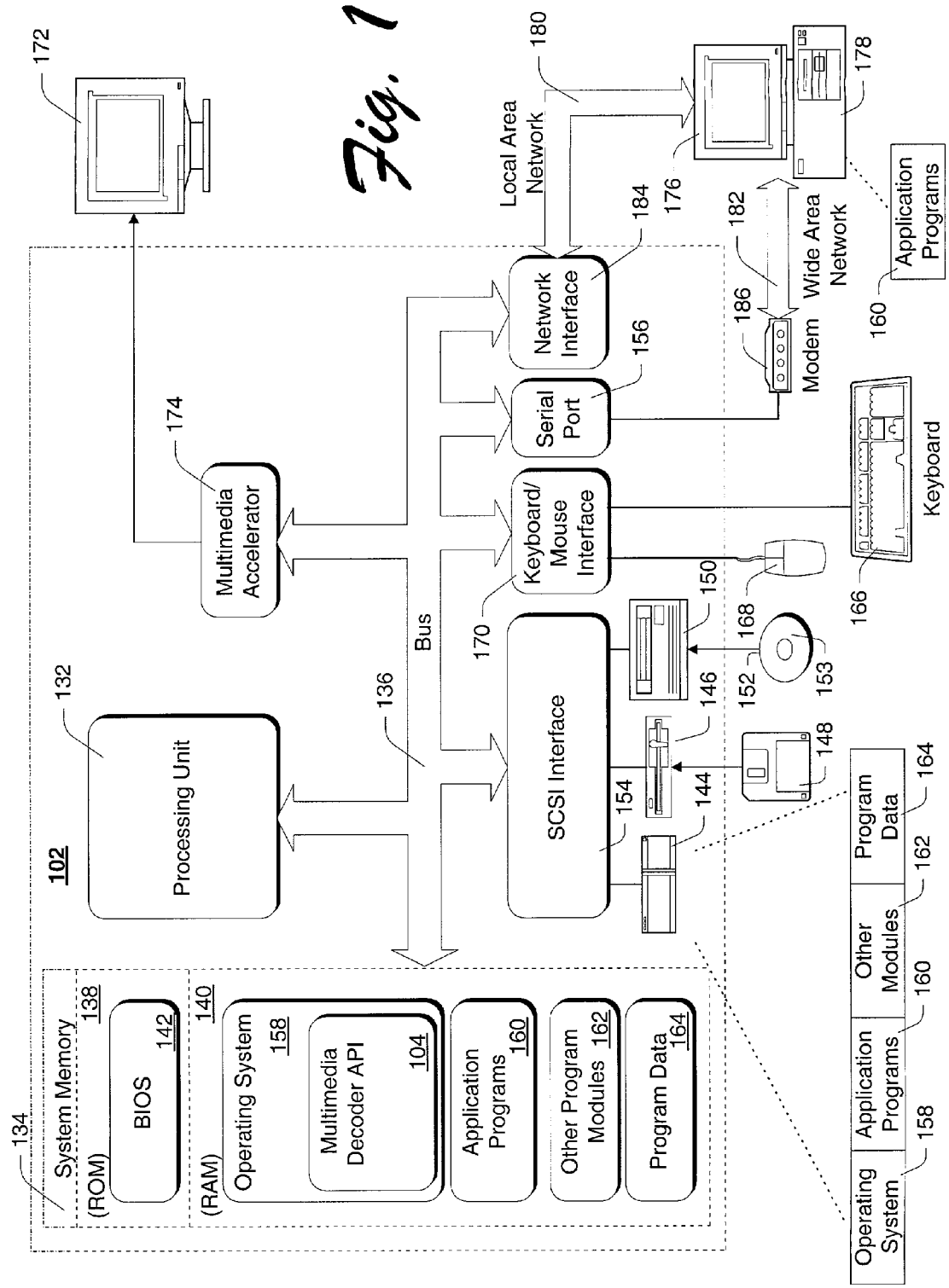

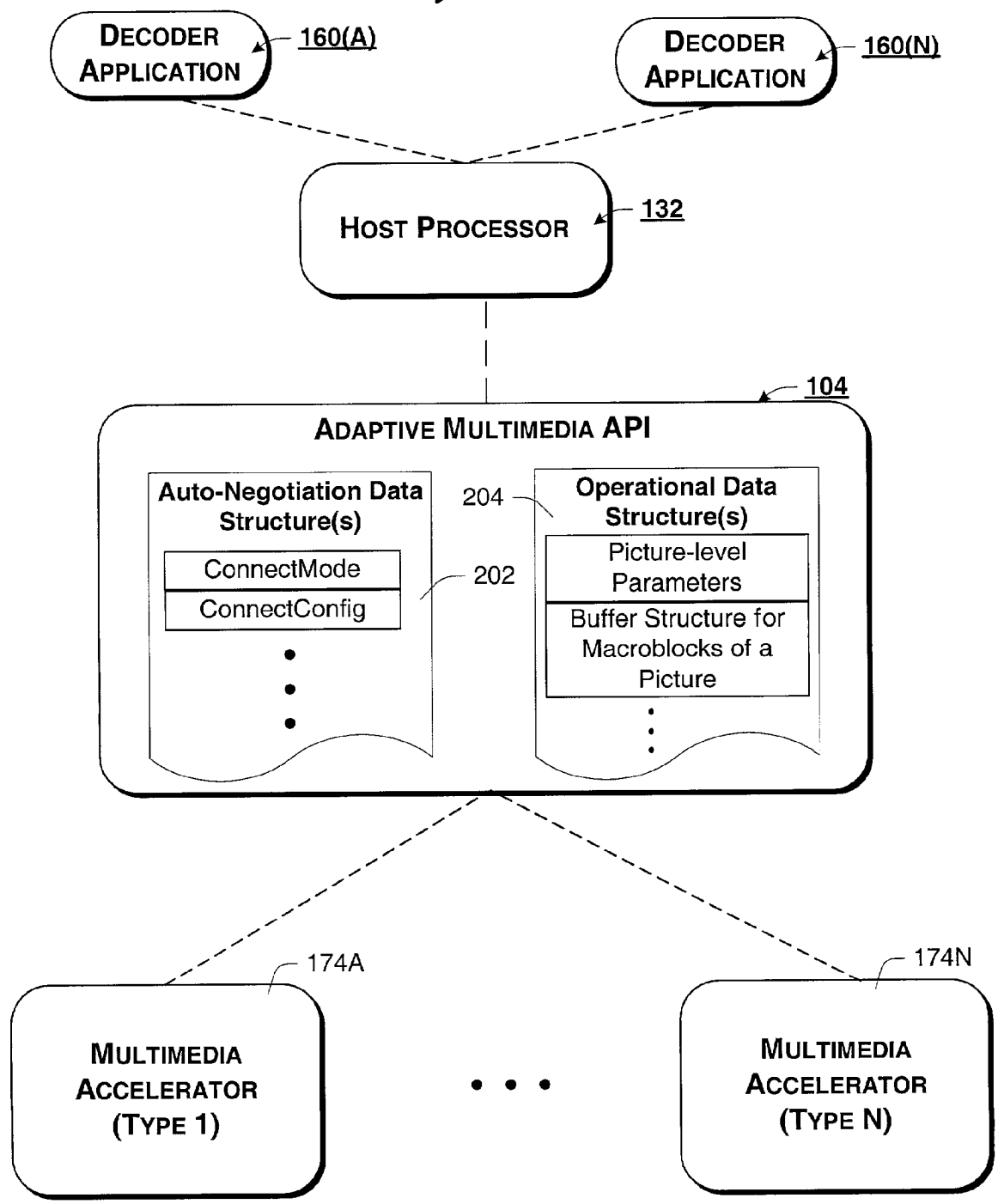

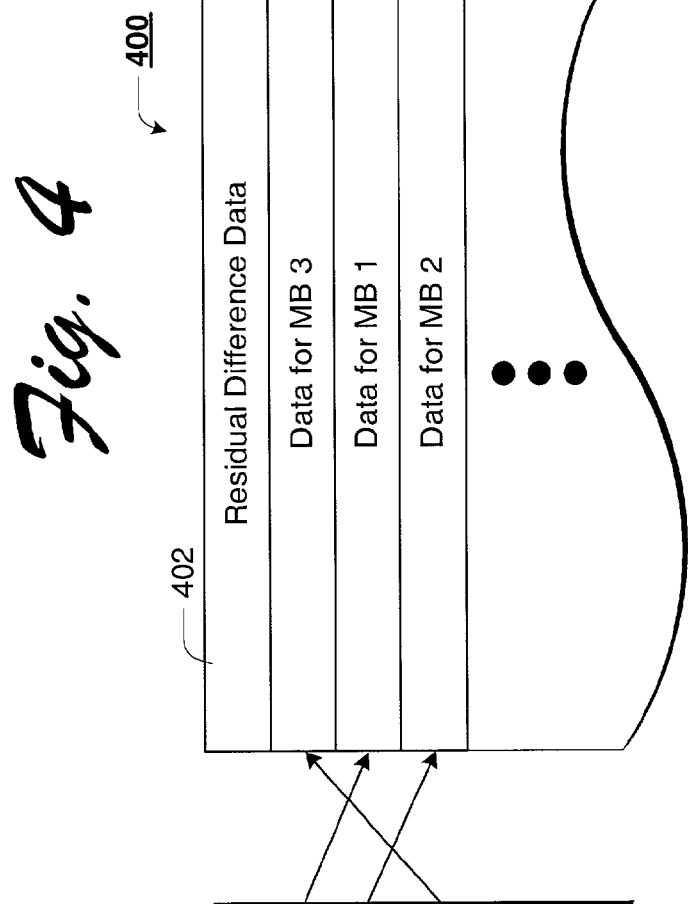
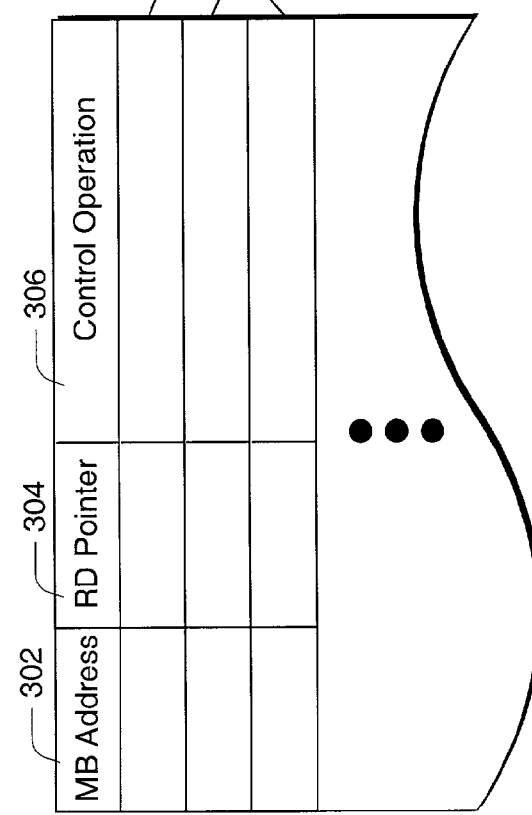

APPLICATION PROGRAM INTERFACE (API) FACILITATING DECODER CONTROL OF ACCELERATOR RESOURCES

RELATED APPLICATIONS

This application claims priority to a provisional application entitled An Adaptive Multimedia Application Interface, Ser. No. 60/198,938, filed on Apr. 21, 2000 by Sullivan, et al. and commonly assigned to the assignee of the present invention.

TECHNICAL FIELD

This invention generally relates to video processing and, in particular, to a multimedia application program interface (API) that automatically identifies and dynamically adapts to processing system capability to improve multimedia processing performance.

BACKGROUND OF THE INVENTION

With recent improvements in processing and storage technologies, many personal computing systems now have the capacity to receive, process and render multimedia objects (e.g., audio, graphical and video content). The multimedia content may be delivered to the computing system in any of a number of ways including, for example, on a compact disk read-only memory (CD-ROM), a digital versatile disk read-only memory (DVD-ROM), via a communicatively coupled data network (e.g., Internet), and the like. Due to the amount of data required to accurately represent such multimedia content, it is typically delivered to the computing system in an encoded, compressed form. To render the multimedia, it must be decompressed and decoded before it is communicated to a display and/or audio device.

A number of multimedia standards have been developed that define the format and meaning of encoded multimedia content for purposes of distribution. Organizations such as the Moving Picture Experts Group (MPEG) under the auspices of the International Standards Organization (ISO), and the Video Coding Experts Group (VCEG) under the auspices of the International Telecommunications Union (ITU), have developed a number of multimedia coding standards, e.g., MPEG-1, MPEG-2, MPEG-4, H.261, H.263, and the like. Such standards define the format and meaning of the coded multimedia content, but not how the encoded content is to generated, and only defines the decoding process in mathematical terms. Consequently, a number of hardware and software solutions have been developed by a number of companies to encode, decode and render multimedia content, often employing proprietary techniques to recover the multimedia content from a particular standardized format.

Simplistically speaking, the encoding process removes spatial and temporal redundancies from the media content, thereby reducing the amount of data needed to represent the media content and, as a result, reducing the bandwidth burden to store and/or transmit such media content. A common encoding process includes a digitization/filtering stage, a prediction stage, and a transformation and difference coding stage. In the digitization/filtering stage, the received analog media content is digitized using, for example, an analog to digital converter and is filtered to remove artifacts. In the prediction stage, spatial and temporal redundancies are identified and removed/reduced using motion estimation prediction techniques. The transformation and difference coding process involves a transformation filtering step (e.g., Discrete Cosine Transform (DCT)), followed by a quantization step and entropy encoding.

Conversely, the decoding process is, simplistically speaking, an inverse of the coding process, e.g., entropy decoding, motion compensated prediction, inverse quantization, inverse transformation, and addition of the inverse transformed result to the prediction. For rendering, an additional step of digital to analog conversion (with filtering) can then be performed to generate an approximate representation of the original analog media signal. It will be appreciated by those skilled in the art that media encoding/decoding is a computationally complex process. A common approach within personal computing devices is to split the decoding process between a decoder application executing on the host processor of the computing system, and a multimedia accelerator. Often, the decoder application provides the front-end processing, i.e., performing some initial decoding (buffering, inverse quantization, etc.) and controlling the overall decoding process. The multimedia accelerator is a functional unit, which executes computationally intensive but repetitive high rate operations in the decoding process, i.e., the motion compensated prediction (MCP) process, the inverse discrete cosine transform (IDCT), and display format conversion operations.

In such implementations, where multimedia decoding is split between a software component (e.g., the decoder executing on a host processor) and a hardware accelerator, a multimedia application program interface (API) is typically employed as a functional interface between the decoder application and the accelerator. Those skilled in the art will appreciate that an API comprises the functions, messages (commands), data structures and data types used in creating applications that run under an operating system. The multimedia API is typically developed by hardware vendors of the accelerators to enable their hardware to interface with particular decoder applications. In this regard, prior art solutions often required the accelerator hardware vendors to develop an API to interface their board with any of a plurality of decoder applications that an end-user may employ to control and render multimedia content.

As introduced above, however, each manufacturer of multimedia decoding applications/accelerators has taken an individual proprietary approach to decoding multimedia content. That is, each of the decoder applications and multimedia accelerators available in the market offer different levels of functionality, often utilizing different data formats or APIs to expose the same basic capability. One accelerator may provide the inverse transformation (e.g., IDCT) as well as motion compensated prediction capability, while another (perhaps lower-end) multimedia accelerator will rely on the host-based decoder application to perform the inverse transformation process and merely provide the motion compensated prediction and/or display format conversion. Consequently, each decoder application/multimedia accelerator combination is a unique multimedia processing system, which heretofore has required a dedicated API.

Another negative consequence of the API proliferation associated with each multimedia accelerator is that it is often necessary or desirable to make changes to the multimedia accelerator—improve processing capability, alter processing techniques, accommodate processing improvements, accommodate developments in computing system technology, etc. Heretofore, whenever such changes were made to the accelerator, a change was necessitated in one or more of the API's associated with the accelerator. In addition to the increased likelihood for the proliferation of unnecessary API's in the end-user's computing system (which may adversely affect system performance), this also unnecessarily complicates the task of writing a decoder application which is intended to use the acceleration capabilities, potentially rendering the decoder incompatible with some accelerators.

Thus, an adaptive multimedia application program interface that transcends particular software and hardware characteristics is needed, unencumbered by the above limitations commonly associated with the prior art.

SUMMARY OF THE INVENTION

This invention concerns a multimedia application program interface (API) facilitating the use of any one or more of a plurality of multimedia accelerators with a decoder application. According to a first implementation of the present invention, a method comprising receiving a command from a decoder application at an application program interface (API), and generating a data structure, recognizable by a communicatively coupled accelerator including one or more parameters which, when received by the accelerator, affects one or more filter settings of the accelerator.

BRIEF DESCRIPTION OF THE DRAWINGS

FIG. 1 is a block diagram of an example computer system incorporating the teachings of the present invention;

FIG. 2 is a block diagram of an example multimedia application program interface (API) incorporating the teachings of the present invention, according to one implementation of the present invention;

FIGS. 3 and 4 provide a graphical illustration of an example control command data structure and a residual difference data structure, respectively, according to one aspect of the present invention;

DETAILED DESCRIPTION

Figure 5:
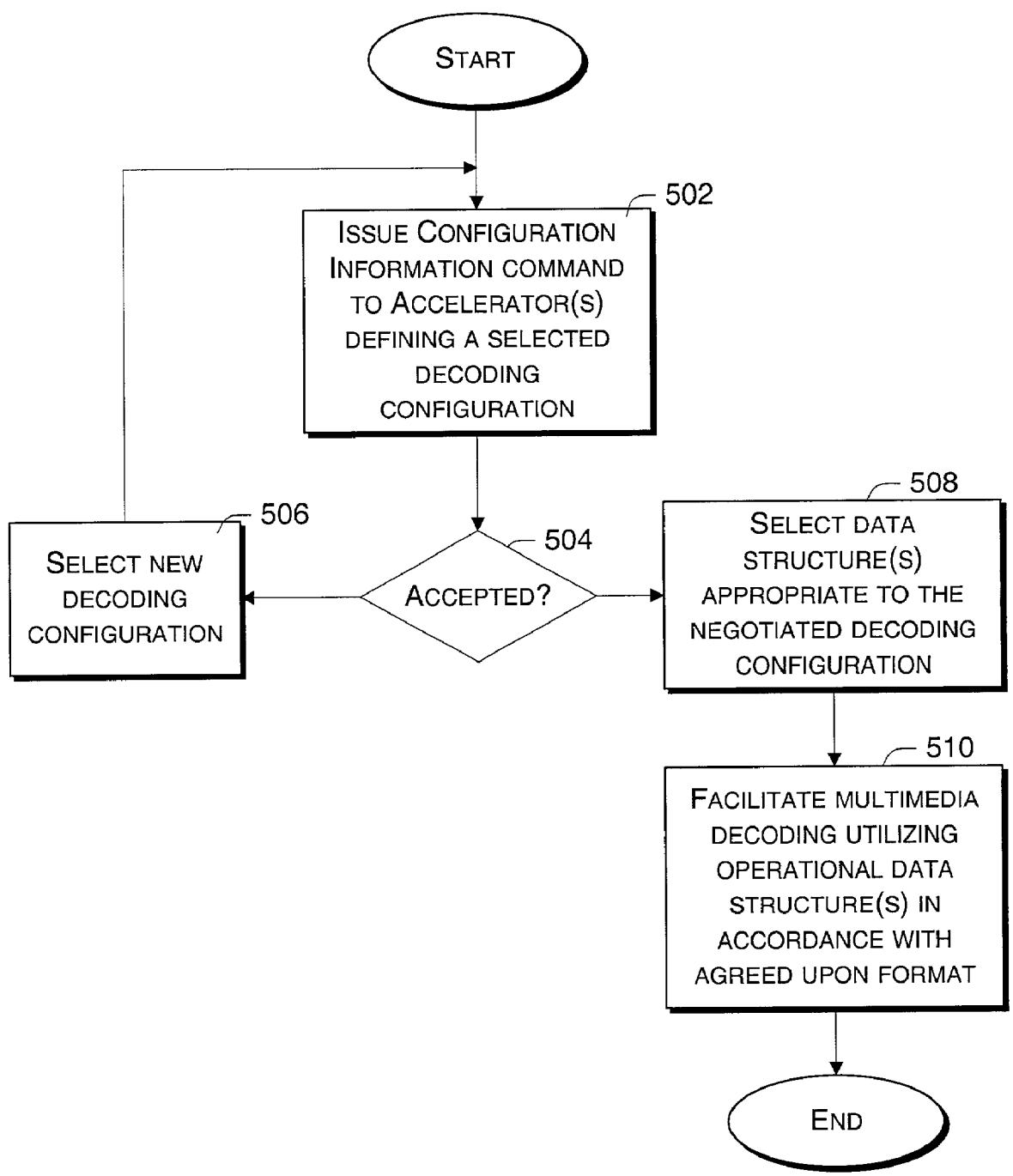
FIG. 5 is a flow chart of an example method interfacing any decoder application with any accelerator without a priori knowledge of the decoder or accelerator to be used, according to one implementation of the present invention.

This invention concerns an application program interface (API) that dynamically adapts to the processing capability of a multimedia processing system to improve multimedia processing performance. In this regard, the present invention is an enabling technology that facilitates innovation in multimedia processing (e.g., encoding and decoding of media content). For ease of illustration and explanation, and not limitation, the teachings of the present invention will be developed within the implementation context of a video decoding system. As such, certain aspects of video decoding process(es) will be described in the context of the present invention. Thus, it is expected that the reader be generally familiar with multimedia decoding. In particular, familiarity with one or more of the H.261, MPEG-1, H.262/MPEG-2, H.263, and MPEG-4 standards will be useful in understanding the operational context of the present invention:

ITU-T Recommendation H.261: Video Codec for Audio-visual Services at Px64 kbit/s, 1993.

ISO/IEC 11172-2 (MPEG-1 Video): Information technology—Coding of moving pictures and associated audio for digital storage media at up to about 1,5 Mbit/s—Part 2: Video, 1993.

ITU-T Recommendation H.262/ISO/IEC 13818-2 (MPEG-2 Video): Information technology—Generic coding of moving pictures and associated audio information: Video, 1995.

ITU-T Recommendation H.263: Video coding for low bit rate communication, 1995; version 2, 1998; version 3, 2000.

ISO/IEC 14496-2 (MPEG-4 Visual): Information technology—Coding of audio-visual objects—Part 2: Visual, 1999.

As such, the foregoing standards are expressly incorporated herein by reference for the purpose of illustrating certain aspects of the decoding process.

It is to be appreciated, however, that the scope of the present invention extends well beyond the particular implementations described. In describing the present invention, example network architectures and associated methods will be described with reference to the above drawings. It is noted, however, that modification to the architecture and methods described herein may well be made without deviating from spirit and scope of the present invention. Indeed, such alternate embodiments are anticipated.

Terminology

It is to be appreciated that those skilled in the art employ various terms of art when describing certain aspects of multimedia content, the encoding and/or decoding process. While one skilled in the art is generally familiar with such terms, a brief list of terminology employed throughout the specification is provided to facilitate understanding of context and detail of the present invention.

BPP—a parameter specifying the number of bits per sample, e.g., eight (8). component—one of three color channels {Y, Cb, Cr}.

host CPU—programmable processor which controls overall function of a computing environment (high level operations).

decoder—an aspect of a media processing system; an application typically executing on a host CPU to perform one or more video decoding functions.

accelerator—an aspect of a media processing system; a functional unit which executes computationally intensive, but high rate operations such as IDCT, MCP, display format conversion.

inverse discrete cosine transform (IDCT)—a transformation operation used as part of a video decoding process.

motion compensated prediction (MCP)—the stage of a video decoding process involving prediction of the values of a new picture using spatially-shifted areas of content from previously-decoded pictures.

media processing system—one or more elements which process (i.e., encode and/or decode) media content in accordance with a coding standard.

intra—representation of picture content without prediction using any previously-decoded picture as a reference.

inter—representation of picture content by first encoding a prediction of an area of the picture using some previously-decoded picture and then optionally adding a signal representing the deviation from that prediction.

residual difference decoding—decoding of the waveform which represents the error signal which has been encoded to represent whatever signal remains after motion-compensated prediction as appropriate. This may entail simply an "intra" representation of a non-predicted waveform or an "inter" difference after prediction.

4:2:0 sampling—a method of representing an image using twice as many luminance (Y) samples, both horizontally and vertically, relative to the number of is samples used for the chrominance (Cb and Cr) components.

macroblock—a set of data comprising the samples necessary to represent a particular spatial region of picture content, including one or more blocks of all color channel components of a video signal. For example, current video coding standards often use 4:2:0 sampling with macroblocks consisting of four 8×8 blocks of Y component data and one 8×8 block of Cb and one 8×8 block of Cr data to represent each 16×16 area of picture content.

globally-unique identifier (GUID)—a 128-bit number used as a unique item identity indication.

Example Computer System

In the discussion herein, the invention is introduced in the general context of computer-executable instructions, such as program modules, application program interfaces, and the like, being executed by one or more computing devices. Generally, such application program interfaces, program modules and the like include routines, programs, objects, components, data structures, etc. that perform particular tasks or implement particular abstract data types. Moreover, those skilled in the art will appreciate that the invention may be practiced with any of a number of alternate computing devices/computing configurations including, for example, a personal computer, hand-held devices, personal digital assistants (PDA), a KIOSK, multiprocessor systems, microprocessor-based or programmable consumer electronics, network PCs, minicomputers, mainframe computers, and the like. In a distributed computer environment, program modules may be located in both local and remote memory storage devices. It is to be appreciated, however, that the present invention may alternatively be implemented in hardware such as, for example, a microcontroller, a processor, an application specific integrated circuit (ASIC), a field-programmable gate array (FPGA), a programmable logic device (PLD), and the like.

FIG. 1 shows a general example of a computing system 102 incorporating the teachings of the present invention. It will be evident, from the discussion to follow, that computer 102 is intended to represent any of a class of general or special purpose computing platforms which, when endowed with the innovative multimedia application program interface (API) 104, implement the teachings of the present invention. In this regard, the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port (AGP), and a processor or local bus using any of a variety of bus architectures. According to one implementation, a decoder application executing on processing unit 132 communicates with a video accelerator via the Personal Computer Interface Accelerated Graphics Port (PCI/AGP) bus. The system memory includes read-only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media.

The hard disk drive 144, magnetic disk drive 146, and optical disk drive 150 are connected to the bus 136 by a SCSI interface 154 or some other suitable bus interface. The drives and their associated computer-readable media provide non-volatile storage of computer readable instructions, data structures, program modules and other data for computer 102.

Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. According to one implementation of the present invention, operating system 158 includes a multimedia application program interface 104 of the present invention, to characterize the processing capability of one or more communicatively coupled multimedia accelerators, and to negotiate processing of received multimedia content between a decoder application and the accelerator(s) based, at least in part, on the identified capability of the accelerator(s). In this regard, the innovative multimedia API 104 adapts multimedia processing of the host system to accommodate identified accelerator peripherals, enabling any multimedia application executing on the host system to interface with any multimedia accelerator, without requiring an application/accelerator-specific API.

A user may enter commands and information into computer 102 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 1.

As shown, the logical connections depicted in FIG. 1 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the "Internet Explorer" Web browser manufactured and distributed by Microsoft Corporation of Redmond, Washington to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is typically connected to the bus 136 via a serial port interface 156. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain is sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Example API Architecture and Functional Relationships

FIG. 2 illustrates a block diagram of an example architecture for an adaptive multimedia API 104, as well as the functional relationships of API 104 to multimedia accelerator(s) 174 and decoder application(s) 160. According to the illustrated example embodiment, adaptive multimedia API 104 facilitates communication between a host processing unit 132, which executes one or more decoder applications (e.g., 160A-N) to render received multimedia content for a user, and one or more multimedia accelerator's 174A-N. According to one aspect of the invention, to be described more fully below, API 104 is not specific to any particular multimedia application 160A-N, host processor 132 and/or multimedia accelerator 174A-N (cumulatively referred to as a multimedia processing system). Unlike prior art multimedia API's which are designed to work with a particular media processing system, API 104 identifies the operational capability of one or more of the multimedia processing system elements and selectively negotiates the processing of received multimedia content across these elements to improve multimedia processing performance. Thus, API 104 may be utilized to facilitate the interoperability of any decoder application with any video decoder accelerator.

As introduced above, in general, an API may well comprise one or more of executable functions, messages, data structures and data types that enable an application to interface with one or more hardware devices. Thus, according to the illustrated example embodiment of FIG. 2, multimedia API 104 is comprised of one or more data structures including one or more auto-negotiation data structure(s) 202 and one or more operational data structure(s) 204.

According to one aspect of the present invention, to be described more fully below, the auto-negotiation data structure(s) 202 of API 104 are selectively invoked by a media processing system element to identify the media processing capability of the media processing system, whereupon API 104 selects one or more operational data structure(s) 204 appropriate to facilitate the negotiated processing of the media among and between the processing system elements. In this regard, API 104 facilitates the processing of media content without a priori knowledge of the processing capability of the elements comprising the media processing system.

Auto-negotiation Data Structure(s)

As used herein, the auto-negotiation data structure(s) 202 are a series of commands, invoked in an iterative fashion by a decoder application, for example, to identify the media decoding capability of an accelerator. According to one implementation of the present invention, the auto-negotiation data structure(s) include (1) a ConnectMode data structure, and (2) a ConnectConfig data structure. According to one implementation, the ConnectMode data structure specifies a proposed mode of operation and/or a proposed video decode format (e.g., MPEG-1, MPEG-2, etc.). A number of alternate modes of operation may well be implemented and defined within the ConnectMode data structure(s) such as, for example, an MPEG-2 mode wherein the API only invokes those data formats necessary for MPEG-2 decoding without further negotiation of other data formats, a protected mode (i.e., utilizing encrypted communication between the decoder and the accelerator), or a normal mode (i.e., non-restricted, non-protected).

The ConnectConfig data structure provides information on how the API 104 is to be configured to decode the video in accordance with the video format identified in the ConnectMode data structure. According to one illustrative example, the ConnectConfig data structure includes information regarding intermediate data formats to be used (if any), which aspects of the decoding process will reside on the host versus the accelerator, and the like. According to one embodiment, the ConnectMode and ConnectConfig data structures are iteratively passed between the decoder and the accelerator utilizing a ConnectInfo command, e.g., ConnectInfo {ConnectMode, ConnectConfig}. The ConnectMode and ConnectConfig data structures can be looked upon as two "orthogonal" aspects of codec construction between the decoder software and video accelerator driver.

According to one implementation, decoder 160 issues the ConnectInfo command with one of a number of Connect-Mode and ConnectConfig combinations, to accommodate any of a number of multimedia codecs. If the accelerator 174 does not support a particular ConnectMode/ConnectConfig combination, a negative response to the ConnectInfo command is sent to the decoder 160. If, however, the accelerator 174 does support the Mode/Config combination, a positive response is issued to decoder 160, as API 104 selects appropriate ones of the operational data structure(s) 204 to facilitate the decoding of the multimedia in the mutually agreed upon format. According to one implementation, API 104 selects a ConnectMode/ConnectConfig combination reflecting the MPEG-2 main profile, main level with host-based IDCT as a default proposal, followed by other combinations. Example ConnectMode and ConnectConfig parameters are introduced with reference to Table I and Table II, respectively, below.

TABLE I

Example ConnectMode Data Structure Settings

ConnectMode {
    ModeGUID   (128b; The Global ID of the Intended Mode)
    dwRestrictedMode   (16b; Restricted Mode ID)
}

As introduced in Table I, above, the ConnectMode data structure passes the GUID of a proposed mode of operation. In addition, in accordance with the illustrated example embodiment, a restricted mode may also be negotiated within the ConnectMode data structure.

TABLE II

Example ConnectConfig Data Structure Parameters

ConnectConfig {
    //Encryption GUIDs
        ConfigBitstreamEncryptionGUID
        ConfigMBcontrolEncryptionGUID
        ConfigRsidDiffEncryptionGUID
    //Bitstream Processing Indicator
        ConfigBitstreamRaw
    //Macroblock Control Configuration
        ConfigMBcontrolRaasterOrder
    //Host Residual Difference Configuration
        ConfigResidDiffHost
        ConfigSpatialResid8
        ConfigOverflowBlocks
        ConfigResid8Subtraction
        ConfigSpatialHost8or9Clipping
    //Accelerator Residual Difference Configuration
        ConfigResidDiffAccelerator
        ConfigHostInverseScan
        ConfigSpecificIDCT
}

With reference to Table II, a number of operational parameters are negotiated within the ConnectConfig data structure including, but not limited to, encryption parameters, bitstream processing indicator, macroblock control configuration information, host residual difference configuration information and accelerator residual difference configuration information. An example implementation of each of the ConnectConfig parameters are introduced, below.

ReservedBits: Any field in this specification having the name ReservedBits as its name or part of its name is not presently used in this specification and shall have the value zero.

guidConfigBitstreamEncryption: Indicates a GUID associated with the encryption protocol type for bitstream data buffers. The value DXVA_NoEncrypt (a GUID name defined in the associated header file) indicates that encryption is not applied. Shall be DXVA_NoEncrypt if ConfigBitstreamRaw is 0.

guidConfigMBcontrolEncryption: Indicates a GUID associated with the encryption protocol type for macroblock control data buffers. The value DXVA_NoEncrypt (a GUID name defined in the associated header file) indicates that encryption is not applied. Shall be DXVA_NoEncrypt if ConfigBitstreamRaw is 1.

guidConfigResidDiffEncryption: Indicates a GUID associated with the encryption protocol type for residual difference decoding data buffers (buffers containing spatial-domain data or sets of transform-domain coefficients for accelerator-based IDCT). The value DXVA_NoEncrypt (a GUID name defined in the associated header file) indicates that encryption is not applied. Shall be DXVA_NoEncrypt if ConfigBitstreamRaw is 1.

ConfigBitstreamRaw: A value of "1" specifies that the data for the pictures will be sent in bitstream buffers as raw bitstream content, and a value of "0" specifies that picture data will be sent using macroblock control command buffers. An intermediate-term requirement is to support "0". Additional support of "1" is desired.

ConfigMBcontrolRasterOrder: A value of "1" specifies that the macroblock control commands within each macroblock control command buffer shall be in raster-scan order, and a value of "0" indicates arbitrary order. For some types of bitstreams, forcing raster order will either greatly increase the number of required macroblock control buffers that must be processed or will require host reordering of the control information. Support of arbitrary order can thus be advantageous for the decoding process. For example, H.261 CIF-resolution decoding can require 36 macroblock control buffers per picture if raster-scan order is necessary within each buffer (H.263 Annex K's arbitrary slice ordering and rectangular slice modes have similar repercussions.) An intermediate-term requirement is to support "0". Additional support of "1" is desired.

ConfigResidDiffHost: A value of "1" specifies that some residual difference decoding data may be sent as blocks in the spatial domain from the host, and a value of "0" specifies that spatial domain data will not be sent. Shall be "0" if ConfigBitstreamRaw is "1". An intermediate-term requirement is to support "1", which is the preferred value.

ConfigSpatialResid8: A value of "1" indicates that host residual difference spatial-domain blocks of prediction residual data for predicted pictures will be sent using 8 bit signed samples, and a value of "0" indicates that such blocks are sent using 16 bit signed samples. (For intra macroblocks, these signed samples are sent relative to a constant reference value of $2^{BPP-1}$.) Shall be "0" if ConfigResidDiffHost is "0".

ConfigOverflowBlocks: A value of "1" indicates that host residual difference spatial blocks of prediction residual data for predicted pictures may be sent using 8 bit signed "overflow" blocks in a second pass for each macroblock rather than sending only one set of signed block data, and a value of "0" indicates that such overflow blocks shall not be sent (instead using a second complete pass for any necessary overflow blocks, such as a "read-modify-write" picture as described below). Shall be "0" if ConfigSpatialResid8 is "0". When ConfigSpatialResid8 is "1", a value of "1" for ConfigOverflowBlocks is considered preferred over a value of "0", as it prevents the need for two complete macroblock control command passes to create a single output picture. An intermediate-term requirement is support of "1" if ConfigSpatialResid8="1" is supported.

ConfigResid8Subtraction: A value of "1" when ConfigSpatialResid8 is "1" indicates that 8-bit differences can be subtracted rather than added. Shall be "0" unless ConfigSpatialResid8 is "1". If "1" with ConfigOverflowBlocks equal to "1", this indicates that any overflow blocks will be subtracted rather than added. If "1" with ConfigOverflowBlocks equal to "0", this indicates that frames may be sent with single-pass subtracted 8-bit spatial differences. An intermediate-term requirement is to support "1" if ConfigSpatialResid8 is "1".

ConfigSpatialHost8 or 9 Clipping: A value of "1" indicates that spatial-domain intra blocks shall be clipped to an 8-bit range on the host and that spatial-domain inter blocks shall be clipped to a 9-bit range on the host, and a value of "0" indicates that any necessary clipping is performed on the accelerator. An intermediate-term requirement is to support "0". Nearer-term support of "1" is allowed but less preferred, and is considered a lower level of accelerator capability.

ConfigSpatialResidInterleaved: A value of "1" when ConfigResidDiffHost is "1" and the YUV format is "NV12" or "NV21" indicates that any spatial-domain residual difference data shall be sent in a chroma-interleaved form matching the YUV format chroma interleaving pattern. Shall be "0" unless ConfigResidDiffHost is "1" and the YUV format is "NV12" or "NV21". An intermediate-term requirement is to support "0". Nearer-term support of "1" is allowed but less preferred, and is considered a lower level of accelerator capability.

ConfigResidDiffAccelerator: A value of "1" indicates that transform-domain blocks of coefficient data may be sent from the host for accelerator-based IDCT, and a value of "0" specifies that accelerator-based IDCT will not be used. If both ConfigResidDiffHost and ConfigResidDiffAccelerator are "1", this indicates that some residual difference decoding will be done on the host and some on the accelerator, as indicated by macroblock-level control commands. Shall be "0" if ConfigBitstreamRaw is "1". Support for ConfigResidDiffAccelerator equal to "1" is desired, but there is not expected to be an intermediate-term requirement for this support. Support for ConfigResidDiffAccelerator being "1" with ConfigResidDiffHost also being "1" indicates that the residual difference decoding can be shared between the host and accelerator on a macroblock basis, and is considered an even higher level of accelerator capability than ConfigResidDiffAccelerator being "1" with ConfigResidDiffHost being "0".

ConfigHostInverseScan: A value of "1" indicates that the inverse scan for transform-domain block processing will be performed on the host, and absolute indices will be sent instead for any transform coefficients, and a value of "0" indicates that inverse scan will be performed on the accelerator. Shall be "0" if ConfigResidDiffAccelerator is "0". An intermediate-term expected requirement is to support "1" if ConfigResidDiffAccelerator is "1". Nearer-term support of "0" is allowed but less preferred, and is considered a lower level of accelerator capability.

ConfigSpecificIDCT: A value of "1" indicates use of the IDCT specified in ITU-T H.263 Annex W, and a value of "0" indicates that any compliant IDCT can be used for off-host IDCT. Shall be zero if ConfigResidDiffAccelerator is "0" (indicating purely host-based residual difference decoding). An intermediate-term expected requirement is to support "0" if ConfigResidDiffAccelerator is "1". Additional support of "1" is desired and is considered a higher level of accelerator capability.

Operational Data Structure(s)

In addition to the auto-negotiation data structure(s) 202, API 104 also includes one or more operational data structure(s) 204. As introduced above, one or more of the operational data structure(s) 204 are selectively invoked by API 104 to facilitate the communication required to effect the negotiated division in media decoding among and between media processing system elements (e.g., decoder application and accelerator). In accordance with the illustrated example embodiment of a video decoding system, the operational data structure(s) 204 include picture level parameters and/or buffer structure for macroblocks of a picture. The picture level parameters the buffer structure required for media decoding depends, at least in part, on which elements of the media processing system will are to perform the various decoding tasks. According to one implementation, API 104 facilitates configuration of a number of picture level parameter(s) (see, e.g., Table III below), and dynamically adapts buffer structure(s) to accommodate Pre-IDCT saturation, Mismatch Control, IDCT, Picture Reconstruction, and Reconstruction Clipping (each of which are discussed in turn, below).

Picture-Level Parameters

One or more picture level parameters are sent using a PictureParameters{ } command within the operational data structure 204 defining a number of picture-level variables once per picture between decoder application and the accelerator. In accordance with the illustrated example embodiment, the picture level parameters of the operational data structure describe one or more aspects of the picture to be decoded such as, for example, one or more picture indices (e.g., decoded picture index, deblocked picture index, etc.), the picture encoding type (e.g., intra-encoded, inter-encoded, etc.), and the like. An example of set of picture level parameters are provided with reference to Table III, below.

TAB III

Example Picture-level Parameters

PictureParameters {
    DecodedPictureIndex
    DeblockedPictureIndex
    SubpictureBlendedIndex
    ForwardRefPictureIndex
    BackwardRefPictureIndex
    IntraPicture
    BPPminus1
    SecondField
    SubpictureControlPresent
    ReservedBits
    MacroblockWidthMinus1
    MacroblockHeightMinus1
    BlockWidthMinus1
    BlockHeightMinus1
    PicWidthInMinus1
    BlockHeightInMinus1
    ChromaFormat
    PicStructure
    Rcontrol
    BidirectionalAveragingMode
    MVprecisionAndChromaRelation
    ReservedBits
    PicSpatialResid8
    PicOverflowBlocks
    PicResid8Subtraction
    PicExtrapolation
    PicDeblocked
    Pic4Mvallowed
    PicOBMC
    PicBinPB
    MV_RPS
    PicDeblockedConfined
    PicReadbackRequests
    ReservedBits
    PicScanFixed
    PicScanMethod
    ReservedBits TAB III-continued Example Picture-level Parameters

```
PicResampleOn
PicResampleBefore
PicResampleRcontrol
ReservedBits
PicResampleSourcePicIndex
PicResampleDestPicIndex
PicResampleSourceWidthMinus1
PicResampleSourceHeightMinus1
PicResampleDestWidthMinus1
PicResampleDestHeightMinus1
PicResampleFullDestWidthMinus1
PicResampleFullDestHeightMinus1
}
```

In accordance with one example implementation, each of the foregoing parameters will be defined, in turn, below:

DecodedPictureIndex: Specifies destination frame buffer for the decoded macroblocks.

DeblockedPictureIndex: Specifies destination frame buffer for the deblocked output picture when bPicDeblocked=1. Has no meaning and shall be zero if bPicDeblocked=0. May be the same as wDecodedPictureIndex.

SubpictureBlendedIndex: Specifies destination frame buffer for the output picture after blending with a DVD subpicture. Subpicture blending shall occur after deblocking if applicable. Shall be equal to wDeblockedPictureIndex or wDecodedPictureIndex as applicable if no subpicture blending is required for the picture.

ForwardRefPictureIndex: Specifies the frame buffer index of the picture to be used as a reference picture for "forward prediction" of the current picture. Shall not be the same as DecodedPictureIndex unless all motion prediction for the current picture uses forward motion with zero-valued motion vectors and no macroblocks are sent as intra and PicSpatialResid8 is 1 and PicOverflowBlocks is 0 and PicResid8Subtraction is 1. NOTE: The ability for wForwardRefPictureIndex to be set equal to wDecodedPictureIndex if all motion prediction uses forward prediction with zero-valued motion vectors is provided to allow processing of 8-bit difference pictures (see PicSpatialResid8, PicOverflowBlocks, and PicResid8Subtraction below) by a two-picture pass process—one pass of decoding to perform motion compensation and to add the first set of 8-bit differences, and a second pass to perform "read-modify-write" operations to subtract a second set of 8-bit differences and obtain the final result.

BackwardRefPictureIndex: Specifies the frame buffer index of the picture to be used as a reference picture for "backward prediction" of the current picture. Shall not be the same as DecodedPictureIndex if backward reference motion prediction is used.

IntraPicture: Indicates whether motion prediction is needed for this picture. If IntraPicture=1, no motion prediction is performed for the picture. Otherwise, motion prediction information shall be sent for the picture.

BPPminus1: Specifies the number of bits per pixel for the video sample values. This shall be at least 7. It is equal to 7 for MPEG-1, MPEG-2, H.261, and H.263. A larger number of bits per pixel is supported in some operational modes of MPEG-4. A derived term called BPP is formed by adding one to bBPPminus1.

SecondField: Indicates whether, in the case of field-structured motion prediction, the current field is the second field of a picture. This is used to determine whether motion compensation prediction is performed using the reference picture or the opposite-parity field of the current picture.

SubpictureControlPresent: Indicates whether a subpicture control buffer is sent for the current picture.

MacroblockWidthMinus1: Specifies the destination luminance sample width of a macroblock. This is equal to 15 for MPEG-1, MPEG-2, H.263, and MPEG-4. A derived term called MacroblockWidth is formed by adding one to MacroblockWidthMinus1.

MacroblockHeightMinus1: Specifies the destination luminance sample height of a macroblock. This is equal to 15 for MPEG-1, MPEG-2, H.261, H.263, and MPEG-4. A derived term called MacroblockHeight is formed by adding one to MacroblockHeightMinus1.

BlockWidthMinus1: Specifies the block width of an residual difference block. This is equal to 7 for MPEG-1, MPEG-2, H.261, H.263, and MPEG-4. Residual difference blocks within a macroblock are sent in the order specified as in H.262 FIGS. 6-10, 6-11, and 6-12 (raster-scan order for Y, followed by all 4:2:0 blocks of Cb in raster-scan order, followed by 4:2:0 blocks of Cr, followed by 4:2:2 blocks of Cb, followed by 4:2:2 blocks of Cr, followed by 4:4:4 blocks of Cb, followed by 4:4:4 blocks of Cr). A derived term called $W_T$ is formed by adding one to BlockWidthMinus1.

BlockHeightMinus1: Specifies the block height of an IDCT block. This is equal to 7 for MPEG-1, MPEG-2, H.261, H.263, and MPEG-4. A derived term called $H_T$ is formed by adding one to BlockHeightMinus1.

PicWidthInMBminus1: Specifies the width of the current picture in units of macroblocks, minus 1. A derived term called PicWidthInMB is formed by adding one to PicWidthInMBminus1.

PicHeightInMBminus1: Specifies the width of the current picture in units of macroblocks, minus 1. A derived term called PicHeightInMB is formed by adding one to PicHeightInMBminus1.

ChromaFormat: Affects number of prediction error blocks expected by the Accelerator. This variable is defined in Section 6.3.5 and Table 6-5 of H.262. For MPEG-1, MPEG-2 "Main Profile," H.261 and H.263 bitstreams, this value shall always be set to '01', indicating "4:2:0" format. If '10' this indicates "4:2:2", and "11" indicates "4:4:4" sampling. Horizontal chroma siting differs slightly between H.261, H.263, MPEG-1 versus MPEG-2 and MPEG-4. This difference may be small enough to ignore.

PicStructure: This parameter has the same meaning as the picture_structure parameter defined in Section 6.3.10 and Table 6-14 of MPEG-2, and indicates whether the current picture is a top-field picture (value '01'), a bottom-field picture (value '10'), or a frame picture (value '11'). In progressive-scan frame-structured coding such as in H.261, PicStructure shall be '11'.

RCONTROL: This flag is defined in H.263 Section 6.1.2. It defines the rounding method to be used for half-sample motion compensation. A value of 0 indicates the half-sample rounding method found in MPEG-1, MPEG-2, and the first version of H.263. A value of 1 indicates the rounding method which includes a downward averaging bias which can be selected in some optional modes of H.263 and MPEG-4. It is meaningless for H.261, since H.261 has no half-sample motion compensation. It shall be set to 0 for all MPEG-1, and M1PEG-2 bitstreams in order to conform with the rounding operator defined by those standards.

BidirectionalAveragingMode: This flag indicates the rounding method for combining prediction planes in bi-directional motion compensation (used for B pictures and Dual-Prime motion). The value 0 is MPEG-1 and MPEG-2 rounded averaging (//2), and 1 is H.263 truncated averaging (/2). This shall be 0 if no bidirectional averaging is needed.

MVprecisionAndChromaRelation: This two-bit field indicates the precision of luminance motion vectors and how chrominance motion vectors shall be derived from luminance motion vectors:

'00' indicates that luminance motion vectors have half-sample precision and that chrominance motion vectors are derived from luminance motion vectors according to the rules in MPEG-2, '01' indicates that luminance motion vectors have half-sample precision and that chrominance motion vectors are derived from luminance motion vectors according to the rules in H.263, '10' indicates that luminance motion vectors have full-sample precision and that chrominance motion vectors are derived from luminance motion vectors according to the rules in H.261 Section 3.2.2 (dividing by two and truncating toward zero to full-sample values), and '11' is reserved.

PicSpatialResid8: A value of 1 indicates that spatial-domain difference blocks for host-based residual difference decoding can be sent using 8-bit samples, and a value of 0 indicates that they cannot. Shall be 0 if ConfigResidDiffHost is 0 or if BPP>8. Shall be 1 if BPP=8 and IntraPicture=1 and ConfigResidDiffHost is "1". If 1, this indicates that spatial-domain intra macroblocks are sent as signed 8-bit difference values relative to the constant value $2^{BPP-1}$ and that spatial-domain non-intra macroblock differences are sent as signed 8-bit difference values relative to some motion compensated prediction. PicSpatialResid8 differs from ConfigSpatialResid8 in that it is an indication for a particular picture, not a global indication for the entire video sequence. In some cases such as in an intra picture with BPP equal to "8", PicSpatialResid8 will be 1 even though ConfigSpatialResid8 may be 0.

PicOverflowBlocks: A value of 1 indicates that spatial-domain difference blocks for host-based residual difference decoding can be sent using "overflow" blocks, and a value of 0 indicates that they cannot. Shall be 0 if ConfigResidDiffHost is 0 or if BPP>8. PicOverflowBlocks differs from ConfigOverflowBlocks in that it is an indication for a particular picture, not a global indication for the entire video sequence. In some cases such as in an intra picture with BPP equal to "8", PicOverflowBlocks will be 0 even though ConfigOverflowBlocks is "1".

PicResid8Subtraction: A value of 1 when PicSpatialResid8 is 1 indicates that some 8-bit spatial-domain residual differences shall be subtracted rather than added, according to one aspect of the present invention. Shall be 0 if PicSpatialResid8 is 0 or ConfigResid8Subtraction is 0. According to one aspect of the present invention, if PicResid8Subtraction is 1 and PicOverflowBlocks is 1, this indicates that the spatial-domain residual difference overflow blocks shall be subtracted rather than added. If PicResid8Subtraction is 1 and PicOverflowBlocks is 0, this indicates that no overflow blocks are sent and that all spatial-domain residual difference blocks shall be subtracted rather than added, and that no macroblocks will be sent as intra macroblocks. This ability to subtract differences rather than add them allows 8-bit difference decoding to be fully compliant with the full ±255 range of values required in video decoder specifications, since +255 cannot be represented as the addition of two signed 8-bit numbers but any number in the range ±255 can be represented as the difference between two signed 8-bit numbers (+255=+127 minus −128). In this regard, API 104 provides a flexible solution to host-based IDCT.

PieExtrapolation: This flag indicates whether motion vectors over picture boundaries are allowed as specified by H.263 Annex D and MPEG-4. This requires either allocation of picture planes which are two macroblocks wider (one extra macroblock at the left and another at the right) and two macroblocks taller (one extra macroblock at the top and another at the bottom) than the decoded picture size, or clipping of the address of each individual pixel access to within the picture boundaries. Macroblock addresses in this specification are for macroblocks in the interior of the picture, not including padding.

PicDeblocked: Indicates whether deblocking commands are sent for this picture for creating a deblocked output picture in the picture buffer indicated in DeblockedPictureIndex. If PicDeblocked=1, deblocking commands are sent and the deblocked frame shall be generated, and if PicDeblocked=0, no deblocking commands are sent and no deblocked picture shall be generated.

Pic4MVallowed: Specifies whether four forward-reference motion vectors per macroblock are allowed as used in H.263 Annexes F and J.

PicOBMC: Specifies whether motion compensation for the current picture operates using overlapped block motion compensation (OBMC) as specified in H.263 Annex F. Shall be zero if Pic4Vallowed is 0.

PicBinPB: Specifies whether bi-directionally-predicted macroblocks in the picture use "B in PB" motion compensation, which restricts the bi-directionally predicted area for each macroblock to the region of the corresponding macroblock in the backward reference picture, as specified in Annexes G and M of H.263.

MV_RPS: Specifies use of motion vector reference picture selection. If 1, this indicates that a reference picture index is sent for each motion vector rather than just forward and possibly backward motion picture indexes for the picture as a whole. If MV_RPS is 1, the parameters ForwardRefPictureIndex and BackwardRefPictureIndex have no meaning and shall be zero.

PicDeblockConfined: Indicates whether deblocking filter command buffers contain commands which confine the effect of the deblocking filter operations to within the same set of macroblocks as are contained in the buffer.

PicReadbackRequests: Indicates whether read-back control requests are issued for the current picture to read back the values of macroblocks in the final decoded picture. A value of 1 indicates that read-back requests are present, and 0 indicates that they are not.

PicScanFixed: When using accelerator-based IDCT processing of residual difference blocks, a value of 1 for this flag indicates that the inverse-scan method is the same for all macroblocks in the picture, and a value of 0 indicates that it is not. Shall be 1 if ConfigHostInverseScan is 1 or if ConfigResidDiffAccelerator is 0.

PicScanMethod: When PicScanFixed is 1, this field indicates the fixed inverse scan method for the picture. When PicScanFixed is 0, this field has no meaning and shall be '00'. If PicScanFixed=1 this field shall have one of the following values:

If ConfigHostInverseScan=0, PicScanMethod shall be as follows:

| | |
|---|---|
| '00' = Zig-zag scan | (H.262 FIG. 7-2), |
| '01' = Alternate-vertical | (H.262 FIG. 7-3), |
| '10' = Alternate-horizontal | (H.263 FIG. I.2 Part a), |

If ConfigHostInverseScan=1, PicScanMethod shall be as follows:

'11'=Arbitrary scan with absolute coefficient address.

PicResampleOn: Specifies whether an input picture is to be resampled to a destination buffer prior to decoding the current picture or whether the final output picture is to be resampled for use as an upsampled display picture or as a future upsampled or downsampled reference picture. The resampling is performed as specified for H.263 Annex O Spatial Scalability or for H.263 Annex P, which we believe to be the same as in some forms of the Spatial Scalability in MPEG-2 and MPEG-4. If this value is 1, the remaining resampling parameters are used to control the resampling operation. If 0, the resampling is not performed and the remaining resampling parameters shall be zero. If PicExtrapolation is 1 and the padding method is used on the accelerator, any resampling shall include padding of the resampled picture as well—and this padding shall be at least one macroblock in width and height around each edge of the resampled picture regardless of the resampling operation which is performed.

PicResampleBefore: Specifies whether the resampling process is to be applied before (a value of 1) the processing of the current picture, or after it (a value of 0). If resampling after decoding is indicated and DeblockedPictureIndex differs from DecodedPictureIndex, the decoded picture (not the deblocked picture) is the one that has the resampling applied to it. If resampling after decoding is indicated and the DeblockedPictureIndex is the same as the DecodedPictureIndex, the deblocking shall be applied to the decoded picture with the result placed in that same destination frame buffer— and the resampling process shall be performed using the deblocked frame buffer as the input picture.

PicResampleRcontrol: Specifies the averaging rounding mode of the resampling operation. In the case of H.263 Annex O Spatial Scalability, this parameter shall be 1. (This corresponds to the value of RCRPR in H.263 Annex P which is equivalent to the upsampling needed for H.263 Annex O spatial scalability.) In the case of H.263 Annex P Reference Picture Resampling, this parameter shall be equal to the H.263 parameter RCRPR.

PicResampleSourcePicIndex: Specifies the reference buffer to be is resampled in order to make it the same size as the current picture.

PicResampleDestPicIndex: Specifies the buffer to be used for the output of the reference picture resampling operation. This buffer can then be used as a reference picture for decoding the current picture.

PicResampleSourceWidthMinus1: Specifies the width of the area of the source picture to be resampled to the destination picture. A derived parameter PicResampleSourceWidth is formed by adding one to PicResampleSourceWidth.

PicResampleSourceHeightMinus1: Specifies the height of the area of the source picture to be resampled to the destination picture. A derived parameter PicResampleSourceHeight is formed by adding one to PicResampleSourceHeight.

PicResampleDestWidthMinus1: Specifies the width of the area of the destination picture to contain the resampled data from the source picture. A derived parameter PicResampleDestWidth is formed by adding one to PicResampleDestWidth.

PicResampleDestHeightMinus1: Specifies the height of the area of the destination picture to contain the resampled data from the source picture. A derived parameter PicResampleDestHeight is formed by adding one to PicResampleSourceHeight.

PicResampleFullDestWidthMinus1: Specifies the full height of the area of the destination picture to contain the resampled data from the source picture. Clipping shall be used to generate any samples outside the source resampling area. (This parameter is necessary for H.263 Annex P support of custom source formats in which the luminance width is not divisible by 16.) A derived parameter PicResampleFullDestWidth is formed by adding one to PicResampleFullDestWidth.

PicResampleFullDestHeightMinus1: Specifies the full height of the area of the destination picture to contain the resampled data from the source picture. Clipping shall be used to generate any samples outside the source resampling area. (This parameter is necessary for H.263 Annex P support of custom source formats in which the luminance height is not divisible by 16.) A derived parameter PicResampleFullDestWidth is formed by adding one to PicResampleFullDestHeight.

Buffer Structure for Macroblocks of a Picture

As introduced above, the second type of operational data structure(s) 204 define the buffer structure for macroblocks of a picture. According to one aspect of the present invention, five (5) types of macroblock buffers are defined herein including, for example, (1) macroblock control command buffers; (2) residual difference block data buffers; (3) deblocking filter control command buffers with or without a restriction on the effect of the filter; (4) read-back buffers containing commands to read macroblocks of the resulting (decoded) picture back into the host; and (5) bitstream buffers. In accordance with one embodiment, another (i.e., sixth) buffer is provided within the operational data structure(s) 204 for DVD subpicture control.

Except for the bitstream buffer(s) and the DVD subpicture buffer(s), each of the foregoing contains commands for a set of macroblocks, wherein the beginning of each buffer contains one or more of (1) the type of data within the buffer as enumerated in the list above (8 bits), (2) the macroblock address of the first macroblock in the buffer (16 bits), (3) the total fullness of the buffer in bytes (32 bits), (4) the number of macroblocks in the buffer (16 bits), and/or (5) reserved bit padding to the next 32 Byte boundary. A decoded picture shall contain one or more macroblock control command buffer(s) if it does not contain bitstream data buffers. The decoding process for every macroblock shall be addressed (only once) in some buffer of each type that is used. For every macroblock control command buffer, there shall be a corresponding IDCT residual coding buffer containing the same set of macroblocks (illustrated, with reference to FIGS. 3 and 4). If one or more deblocking filter control buffers are sent, the set of macroblocks in each deblocking filter control buffer shall be the same as the set of macroblocks in the corresponding macroblock control and residual coding buffers.

The processing of the picture requires that motion prediction for each macroblock must precede the addition of the IDCT residual data. According to one implementation of the present invention, this is accomplished either by processing the motion prediction commands first and then reading this data back in from the destination picture buffer while processing the IDCT residual coding commands, or by processing these two buffers in a coordinated fashion, i.e., adding the residual data to the prediction before writing the result to the destination picture buffer. The motion prediction command and IDCT residual coding command for each macroblock affect only the rectangular region within that macroblock.

A deblocking filter command for a macroblock may require access to read the reconstructed values of two rows and two columns of samples neighboring the current macroblock at the top and left as well as reconstructed values within the current macroblock. It can result in modification of one row and one column of samples neighboring the current macroblock at the top and left as well as three rows and three columns within the current macroblock. The filtering process for a given macroblock may therefore require the prior reconstruction of other macroblocks. Two different types of deblocking filter buffers are defined herein: (1) a buffer type which requires access and modification of the value of reconstructed samples for macroblocks outside the current buffer (e.g., when PicDeblockConfined is set to '0'), and (2) a buffer type which does not (e.g., when PicDeblockConfined is set to '1'). To process the first of these two types of deblocking command buffer, the accelerator must ensure that the reconstruction has been completed for all buffers which affect macroblocks to the left and top of the macroblocks in the current buffer before processing the deblocking commands in the current buffer. Processing the second of these two types requires only prior reconstruction values within the current buffer. The deblocking post-processing can be conducted either by processing the motion prediction and IDCT residual coding commands for the entire buffer or frame first, followed by reading back in the values of some of the samples and modifying them as a result of the deblocking filter operations, or by processing the deblocking command buffer in a coordinated fashion with the IDCT residual coding buffer—performing the deblocking before writing the final output values to the destination picture buffer. Note also that the destination picture buffer for the deblocked picture may differ from that of the reconstructed picture prior to deblocking, in order to support "outside the loop" deblocking as a post-processing operation which does not affect the sample values used for prediction of the next picture.

Table IV, below, provides example macroblock control commands, selectively invoked by API 104 in operational data structure(s) 204 in response to a negotiated decoding format and media processing task allocation among and between media processing system elements.

TABLE IV

Example Control Commands

```
if (IntraPicture)
    NumMV = 0;
else if(PicOBMC) {
    NumMV = 10;
    if(PicBinPB)
        NumMV++;
}else{
    NumMV = 4;
    if(PicBinPB && Pic4MVallowed)
        NumMV++;
}
if(ChromaFormat == '01')
    NumBlocksPerMB = 6
else if(ChromaFormat == '10')
    NumBlocksPerMB = 8
else
    NumBlocksPerMB = 12
MB_Control {
    // General Macroblock Info
        MBaddress
        MBtype
        MBskipsFollowing
    // Residual Difference Info
        MBdataLocation
        PatternCode
        if(PicOverflowBlocks==1 && IntraMacroblock==0) {
            PC_Overflow
            ReservedBits2
        } else if(HostResidDiff)
            ReservedBits3
        else
            for(i=0; i<NumBlocksPerMB; i++)
```

TABLE IV-continued

Example Control Commands

```
                NumCoef[i]
    // Motion Prediction Info
        for(i=0; i<NumMV; i++) {
            MVector[i].horz
            MVector[i].vert
        }
        if(MV_RPS)
            for(i=0; i<NumMV; i++)
                RefPicSelect[i]
        ReservedBits4
}
```

Each of the various control command attributes are described, in turn, below.

MBaddress: Specifies the macroblock address of the current macroblock in raster scan order (0 being the address of the top left macroblock, PicWidthInMBminus 1 being the address of the top right macroblock, and PicHeightInMBminus 1 * PicWidthInMB being the address of the bottom left macroblock, and PicHeightInMBminus1 * PicWidthInMB+ PicWidthInMBminus1 being the address of the bottom right macroblock).

MBtype: Specifies the type of macroblock being processed as described below:
  bit 15: MvertFieldSel[3] (The MSB),
  bit 14: MvertFieldSel[2],
  bit 13: MvertFieldSel[1],
  bit 12: MvertFieldSel[0]: Specifies vertical field selection for corresponding motion vectors sent later in the macroblock control command, as specified in further detail below. For frame-based motion with a frame picture structure (e.g., for H.261 and H.263), these bits shall all be zero. The use of these bits is the same as that specified for the corresponding bits in Section 6.3.17.2 of H.262.
  bit 11: ReservedBits.
  bit 10: HostResidDiff: Specifies whether spatial-domain residual difference decoded blocks are sent or whether transform coefficients are sent for off-host IDCT for the current macroblock.
  bits 9 and 8: MotionType: Specifies the motion type in the picture, as specified in further detail below. For frame-based motion with a frame picture structure (e.g., for H.261 and H.263), these bits shall be equal to '10'. The use of these bits is the same as that specified for the corresponding bits in Section 6.3.17.1 and Table 6-17 of H.262.
  bits 7 and 6: MBscanMethod: Shall equal PicScanMethod if PicScanFixed is 1.
  If ConfigHostInverseScan=0, MBscanMethod shall be as follows:

| | |
|---|---|
| '00' = Zig-zag scan | (H.262 FIG. 7-2), |
| '01' = Alternate-vertical | (H.262 FIG. 7-3), |
| '10' = Alternate-horizontal | (H.263 FIG. I.2 Part a), |

If ConfigHostInverseScan=1, MBscanMethod shall be equal to:
    '11'=Arbitrary scan with absolute coefficient address.
  bit 5: FieldResidual: A flag indicating whether the IDCT blocks use a field IDCT structure as specified in H.262.
  bit 4: H261LoopFilter: A flag specifying whether the H.261 loop filter (Section 3.2.3 of H.261) is active for the current macroblock prediction. The H.261 loop filter is a separable ¼, ½, ¼ filter applied both horizontally and vertically to all six blocks in an H.261 macroblock except at block edges where one of the taps would fall outside the block. In such cases the filter is changed to have coefficients 0, 1, 0. Full arithmetic precision is retained with rounding to 8-bit integers at the output of the 2-D filter process (half-integer or higher values being rounded up).

bit 3: Motion4MV: A flag indicating that forward motion uses a distinct motion vector for each of the four luminance blocks in the macroblock, as used in H.263 Annexes F and J. Motion4MV shall be 0 if MotionForward is C or Pic4MVallowed is 0.

bit 2: MotionBackward: A flag used as specified for the corresponding parameter in H.262. Further information on the use of this flag is given below.

bit 1: MotionForward: A flag used as specified for the corresponding flag in H.262. Further information on the use of this flag is given below.

bit 0: IntraMacroblock: (The LSB) A flag indicating that the macroblock is coded as "intra", and no motion vectors are used for the current macroblock. Further information on the use of this flag is given below.

MBskipsFollowing: Specifies the number of "skipped macroblocks" to be generated following the current macroblock. Skipped macroblocks shall be generated using the rules specified in H.262 Section 7.6.6. According to one implementation, the API 104 operates by using an indication of the number of skipped macroblocks after the current macroblock instead of the number of skipped macroblocks before the current macroblock. Insofar as the method of generating skipped macroblocks as specified in H.262 Section 7.6.6 depends on the parameters of the macroblock preceding the skipped macroblocks, specifying the operation in this way means that only the content of a single macroblock control structure need be accessed for the generation of the skipped macroblocks.

For implementation of standard video codecs other than H.262 (MPEG-2), some "skipped" macroblocks may need to be generated with some indication other than the skipped macroblock handling used by MBskipsFollowing if the skipped macroblock handling differs from that of H.262.

The generation of macroblocks indicated as skipped in H.263 with Advanced Prediction mode active requires coding some "skipped" macroblocks as non-skipped macroblocks using this specification—in order to specify the OBMC effect within these macroblocks.

MBdataLocation: An index into the IDCT residual coding block data buffer, indicating the location of the residual difference data for the blocks of the current macroblock, expressed as a multiple of 32 bits.

PatternCode: When using host-based residual difference decoding, bit 11 -i of wPatternCode (where bit 0 is the LSB) indicates whether a residual difference block is sent for block i, where i is the index of the block within the macroblock as specified in FIGS. 6-10, 6-11, and 6-12 (raster-scan order for Y, followed by 4:2:0 blocks of Cb in raster-scan order, followed by 4:2:0 blocks of Cr, followed by 4:2:2 blocks of Cb, followed by 4:2:2 blocks of Cr, followed by 4:4:4 blocks of Cb, followed by 4:4:4 blocks of Cr). The data for the coded blocks (those blocks having bit 11-i equal to 1) is found in the residual coding buffer in the same indexing order (increasing i). For 4:2:0 H.262 data, the value of wPatternCode corresponds to shifting the decoded value of CBP left by six bit positions (those lower bit positions being for the use of 4:2:2 and 4:4:4 chroma formats).

If ConfigSpatialResidInterleaved is "1", host-based residual differences are sent in a chroma-interleaved form matching that of the YUV pixel format in use. In this case each Cb and spatially-corresponding Cr pair of blocks is treated as a single residual difference data structure unit. This does not alter the value or meaning of PatternCode, but it implies that both members of each pair of Cb and Cr data blocks are sent whenever either of these data blocks has the corresponding bit set in PatternCode. If the bit in PatternCode for a particular data block is zero, the corresponding residual difference data values shall be sent as zero whenever this pairing necessitates sending a residual difference data block for a block with a PatternCode bit equal to zero.

PC_Overflow: When using host-based residual difference decoding with PicOverflowBlocks (the innovative 8-8 overflow method introduced above, and described in greater detail below), PC_Overflow contains the pattern code of the overflow blocks as specified in the same manner as for PatternCode. The data for the coded overflow blocks (those blocks having bit 11-i equal to 1) is found in the residual coding buffer in the same indexing order (increasing i).

NumCoef[i]: Indicates the number of coefficients in the residual coding block data buffer for each block i of the macroblock, where i is the index of the block within the macroblock as specified in H.262 FIGS. 6-10, 6-11, and 6-12 (raster-scan order for Y, followed by 4:2:0 blocks of Cb in raster-scan order, followed by 4:2:0 blocks of Cr, followed by 4:2:2 blocks of Cb, followed by 4:2:2 blocks of Cr, followed by 4:4:4 blocks of Cb, followed by 4:4:4 blocks of Cr). The data for these coefficients is found in the residual difference buffer in the same order.

MVector[i].horz, MVector[i].vert: Specifies the value of a motion vector in horizontal and vertical dimensions. The two-dimensional union of these two values is referred to as MVvalue[i]. Each dimension of each motion vector contains a signed integer motion offset in half-sample units. Both elements shall be even if MVprecisionAndChromaRelation='10' (H.261-style motion supporting only integer-sample offsets).

RefPicSelect[i]: Specifies the reference picture buffer used in prediction for MVvalue[i] when motion vector reference picture selection is in use.

IDCT Support

According to one aspect of the present invention, API 104 supports at least three (3) low-level methods of handling inverse discrete cosine transform (IDCT) decoding via the operational data structure(s) 204. In all cases, the basic inverse quantization process, pre-IDCT range saturation, and mismatch control (if necessary) is performed by the decoder 160 (e.g., on the host), while the final picture reconstruction and reconstruction clipping is done on the accelerator 174. The first method is to pass macroblocks of transform coefficients to the accelerator 174 for external IDCT, picture reconstruction, and reconstruction clipping. The second and third methods involve performing an IDCT by the decoder 160 and passing blocks of spatial-domain results for external picture reconstruction and clipping on the accelerator 174.

According to one implementation (also denoted with reference to FIG. 6), the pre-IDCT saturation, mismatch control, IDCT, picture reconstruction and clipping processes are defined as:

(1) Saturating each reconstructed coefficient value in the transform coefficient block to the allowable range (typically performed by the decoder 160):

$$-2^{BPP+log2\sqrt{W^{THT}}} \leq F'(u,v) \leq 2^{BPP+log2\sqrt{W^{THT}}}-1 \quad (1)$$

(2) Mismatch control (as necessary in association with MPEG-2 decoding) is performed by adding the saturated values of all coefficients in the macroblock. According to one implementation, this is performed by XORing the least significant bits. If the sum is even, then the saturated value of the last coefficient $F'(W_T-1,H_T-1)$ is modified by subtracting one if it is odd, or adding one if it is even. The coefficient values subsequent to saturation and mismatch control are denoted herein as $F(u, v)$.

(3) Unitary separable transformation is performed (either on the host or the accelerator, as negotiated):

$$f(x, y) = \frac{1}{\sqrt{H_T}} \sum_{v=0}^{H_T-1} C(v) \cos\left[\frac{(2y+1)v\pi}{2H_T}\right] \left\{ \frac{1}{\sqrt{W_T}} \sum_{u=0}^{W_T-1} C(u) \cos\left[\frac{(2x+1)u\pi}{2W_T}\right] F(u, v) \right\}$$

where: $C(u)=1$ for $u=0$, otherwise the square root of 2 ($\sqrt{2}$);
$C(v)=1$ for $v=0$, otherwise $\sqrt{2}$;
x and y are the horizontal and vertical spatial coordinates in the pixel domain; and
$W_T$ and $H_T$ are the width and height of the transform block.

(4) Adding the spatial-domain residual information to the prediction for non-intra macroblocks to perform picture reconstruction (on the accelerator 174).

(5) Clipping the picture reconstruction to a range of $[0, 2^{BPP}-1]$ to store as the final resulting picture sample values (on the accelerator 174).

Host v. Accelerator IDCT

As alluded to above, API 104 provides for off-host (e.g., accelerator-based) and host-based IDCT processing of multimedia content (described more fully below with FIG. 7). The transfer of macroblock IDCT coefficient data for off-host IDCT processing consists of a buffer of index and value information. According to one implementation, index information is sent as 16-bit words (although, only 6-bit quantities are really necessary for 8×8 transform blocks), and transform coefficient value information is sent as signed 16-bit words (although only 12-bits are really needed). According to one implementation, the transform coefficient is sent as a Tcoeff data structure as follows:

---

Tcoeff {
    TCoefIDX (specifies the index of the coefficient in the block)
    TCoefEOB (denotes last coefficient in block)
    TcoefValue (the value of the coefficient in the block)
}

---

TCoefIDX: specifies the index of the coefficient in the block, as determined from ConfigHostInverseScan. There are two basic ways that TCoefIDX can be used:

Run-length ordering: When ConfigHostInverseScan is 0, MBscanMethod indicates a zig-zag, alternate-vertical, or alternate-horizontal inverse scan. In this case, TCoefIDX contains the number of zero-valued coefficients which precede the current coefficient in the specified scan order, subsequent to the last transmitted coefficient for the block (or the DC coefficient if no preceding).

Arbitrary ordering: When ConfigHostInverseScan is 1, MBscanMethod indicates arbitrary ordering. In this case, TCoefIDX simply contains the raster index of the coefficient within the block (i.e., TCoefIDX=u+v·$W_T$)

TCoefIDX shall never be greater than or equal to $W_T$·$H_T$.

TCoefEOB: Indicates whether the current coefficient is the last one associated with the current block of coefficients. A value of 1 is indicates that the current coefficient is the last one for the block, and a value of 0 indicates that it is not.

TCoefValue: The value of the coefficient in the block. TCoefValue shall be clipped to the appropriate range as specified in Section 3.4.2 above by the host prior to passing the coefficient value to the accelerator for inverse DCT operation. H.262 mismatch control, if necessary, is also the responsibility of the host, not the accelerator.

Alternatively, API 104 also supports host-based IDCT (e.g., by the decoder 160), with the result passed through API 104 to accelerator 174. In accordance with the teachings of the present invention, there are two supported schemes for sending the results: (1) the 16-bit method and the (2) 8-8 overflow method. An indication of which is being used is sent via the hostIDCT__8or __16bit command in the operational data structure(s) 204.

When sending data using the 16-bit method, blocks of data are sent sequentially. Each block of spatial-domain data consists of $W_T$·$H_T$ values of DXVA_Sample16 which, according to one embodiment, is a 16-bit signed integer. If BPP is greater than 8, only the 16 bit method is allowed. If IntraPicture='1' and BPP is 8, the 16-bit method is not allowed. For intra data, the samples are sent as signed quantities relative to a reference value of $2^{BPP-1}$.

According to one aspect of the present invention, API 104 supports an alternative to the 16-bit method, i.e., the 8 bit difference method. If BPP=8, the 8-bit difference method may well be used. As alluded to above, its use is required if IntraPicture is '1' and BPP=8. In this case, each spatial-domain difference value is represented using only 8 bits. If IntraMacroblock is '1', the 8-bit samples are signed differences to be added relative to $2^{BPP-1}$, whereas if IntraMacroblock is '0' they are signed differences to be added or subtracted (as denoted by PicResid8Subtraction) relative to a motion compensation prediction. If IntraMacroblock is '0' and the difference to be represented for some pixel in a block is too large to represent using only 8 bits, a second "overflow" block of samples can be sent if ConfigOverflowBlocks is '1'. In this case, blocks of data are sent sequentially, in the order specified by scanning PatternCode for '1' bits from most-significant-bit (MSB) to least-significant-bit (LSB), and then all necessary 8-bit overflow blocks are sent as specified by PC_Overflow. Such overflow blocks are subtracted rather than added if PicResid8Subtraction is '1'. If ConfigOverflowBlocks is '0', then any overflow blocks can only be sent in a completely separate pass as a distinct picture. Each block of 8-bit spatial-domain residual difference data consists of $W_T$·$H_T$ values of DXVA_Sample8 (an eight bit signed integer).

If PicResid8Subtraction is '1' and PicOverflowBlocks is '0', IntraMacroblock shall be '0'. If PicOverflowBlocks is '1' and PicResid8Subtraction is a '1', the first pass of 8-bit differences for each non-intra macroblock is added and the second pass is subtracted. If PicOverflowBlocks is '1' and PicResid8Subtraction is '0', both the first pass and the second pass of 8-bit differences for each non-intra macroblock are added. If PicResid8Subtraction is '0' and PicOverflowBlocks is '0', the single pass of 8-bit differences is added. If PicResid8Subtraction is '1' and PicOverflowBlocks is '0', the single pass of 8-bit differences is subtracted.

Read-back Buffers

According to one implementation, API 104 utilizes one read-back buffer in operational data structure(s) 204 when PicReadbackRequests='1', which commands the accelerator 174 to return resulting final picture macroblock to decoder 160 on the host (e.g., after any deblocking and subpicture sampling, yet prior to any output resampling). The buffer passed to the accelerator shall contain read-back commands containing a single parameter per macroblock read:

MBaddress: Specifies the macroblock address of the current macroblock in raster scan order. If BPP is 8, the data shall be returned in the form of 8-bit signed values, otherwise in the form of 16-bit signed values (relative to $2^{BPP-1}$).

The data is returned to the decoder 160 in the form of (1) a copy of the read-back command buffer itself followed by padding to the next 32-byte alignment boundary; and (2) the macroblock data values. The macroblock data values are returned in the order sent in the read-back command buffer, in the form $W_T \cdot H_T$ samples per block for each block in each macroblock. Residual difference blocks within a macroblock shall be returned in raster-scan order for Y, followed by all 4:2:0 blocks of Cb in raster scan order, followed by 4:2:0 blocks of Cr, followed by 4:2:2 blocks of Cb, and so on.

Bitstream Data Buffer

API 104 also supports a bitstream data buffer within operational data structure(s) 204. As used herein, the bitstream data buffer, if used, primarily contains raw bytes from a video bitstream to support off-host (e.g., accelerator 174) decoding including low-level bitstream parsing with variable length decoding. According to one example implementation, the beginning of such a buffer contains one or more of (1) the number '5' encoded in 8-bits to denote the bitstream buffer, (2) the sequence number of the buffer within the picture, starting with the first such buffer being buffer zero (0), (3) the total size of the buffer in bytes, (4) if the sequence number is zero, the relative location within the bitstream data of the first bit after the picture header data, i.e., the first bit of the group of blocks (GOB) or slice, or macroblock layer data, and (5) reserved bit padding to the next 32 byte boundary.

The remaining contents of the buffer are the raw bytes of a video bitstream encoded according to a specified video coding format. The buffer with sequence number zero start with the first byte of the data for the picture and the bytes thereafter follow in bitstream order.

DVD Subpicture Control Buffer

As introduced above, operational data structure(s) 204 may also include a subpicture control buffer to support digital versatile disc (or DVD) applications. API 104 is invoked in support of such an application, the content of the subpicture control buffer within the operational data structure(s) 204 includes one or more of the following:

SubpictureBufferIndicator
ReservedBits
BufferSize
BlendType
ButtonColor
ButtonTopLeftHorz
ButtonTopLeftVert
ButtonBotRightHorz
ButtonBotRightVert
ButtonHighlightActive
PaletteIndicator
PaletteData
NewSubpictureUnitSize
DCSQTStartAddress
SubpictureUnitData SubpictureBufferIndicator: The number "6", indicating a DVD subpicture buffer.

BufferSize: The total number of bytes in the buffer.

BlendType: A value of "0" indicates that no subpicture blending is active for the current picture. A value of "1" indicates that the last previously-sent subpicture data is used for blending the current picture, and a value of "2" indicates that a new subpicture sent in the current buffer is used for blending the current picture.

ButtonColor: Contains the color of a rectangular button on the subpicture.

ButtonTopLeftHorz, ButtonTopLeftVert, ButtonBotRightHorz,

ButtonBotRightHorz: Contains the zero-based 2-d location of the top left and bottom right coordinates of the button.

ButtonHighlightActive: Indicates whether or not the button is currently highlighted.

PaletteIndicator: Indicates whether or not a new palette is contained in the buffer.

PaletteData: If PaletteIndicator is "1", contains the new palette. Otherwise not present.

NewSubpictureUnitSize: The size of a new subpicture unit contained in the buffer. If "0", indicates that no new subpicture unit is contained in the buffer.

DCSQTStartAddress: The byte location within the SubpictureUnitData at which the subpicture display control sequence is found.

SubpictureUnitData: The subpicture PXD and SP_DC-SQT data for the new subpicture unit.

According to one aspect of the present invention, the control command data structure and the residual difference data structure of the operational data structure(s) 204 are a fixed size for each macroblock within a picture based, at least in part, on one or more of the negotiated coding format, the API configuration and the picture type. That is, API 104 utilizes fixed-size data structures to facilitate communication between any video decoder 160 and any video accelerator 174 according to any codec. Example data control command and residual difference data structures are provided with reference to FIGS. 3 and 4, respectively.

Example Data Structures

FIGS. 3 and 4 graphically illustrate an example control command data structure 300 and a residual difference data structure 400 for a plurality of elements of received multimedia content. For purposes of illustration, and not limitation, the data structures are presented in accordance with the video decoding embodiment used throughout, wherein the data structures are incrementally populated with video information on a macroblock basis. According to one aspect of the present invention, introduced above, each of the control command data structures are of fixed size for each macroblock within a picture.

As shown, each element within the control command data structure 300 includes an address field 302, a pointer to an associated residual difference data structure element 304, and a command field 306. The address field 302 denotes which macroblock of a frame the data structure element is associated with. Use of the macroblock address field 302 facilitates parallel processing of the multimedia content.

The residual difference pointer field 304 contains pointers to associated elements in the residual difference data structure 400. It is to be appreciated that not every macroblock will have residual difference data, and the amount of residual data may vary from macroblock to macroblock. Thus, use of the pointer field 304 relieves API 104 from having to inferentially associate each element of control command data structure 300 with an element of residual difference data structure 400.

The macroblock control command field 306 contains one or more commands instructing the decoder on what action to take with respect to the particular macroblock. In general, the control command field 306 contains information regarding encryption of the data sent between decoder 160 and accelerator 174, picture-level parameters, processing and communication control parameters.

In addition, as introduced above, decoder 160 may well provide accelerator 174 with raw bitstream data, e.g., on a per-slice basis. In such an instance, API 104 generates a bitstream buffer to pass the raw bitstream data to the accelerator. According to one implementation, analogous to the control command data structure/residual difference data structure combination, the raw bitstream data buffer is associated with a slice control data structure, to pass slice control information from the decoder to the accelerator.

Example Operation and Implementations

As introduced above, API 104 is an enabling technology in that it facilitates communication between a decoder application 160 and a hardware accelerator 174 as to the specific decoder/accelerator combination to be used. Having introduced the architectural detail of API 104, above, attention is now directed to FIGS. 5-8 wherein an example implementation is described.

FIG. 5 is a flow chart of an example method for interfacing a decoder application with a hardware accelerator to cooperatively decode encoded multimedia content, in accordance with the teachings of the present invention. For ease of explanation, and not limitation, the method of FIG. 5 will be developed with continued reference to FIGS. 1-4.

Turning to FIG. 5, the method begins with block 502 which represents a step of iteratively issuing configuration commands reflecting various alternative degrees and methods of decoding acceleration capability until choosing one that is acceptable to both the decoder and the accelerator. Specifically, a media processing system element issues a ConfigInfo data structure to other media processing system elements, as the auto-negotiation process of API 104 is selectively invoked. According to one example embodiment, the auto-negotiation data structure(s) 202 of API 104 are generated by decoder 160 and reflect a proposed decoding format (ConnectMode), intermediate data format and other decoding details (ConnectConfig).

In block 504, the issuing media processing element (e.g., decoder 160) receives a response to the issued auto-negotiation data structure(s) 202 denoting whether the media processing element(s) (e.g., accelerator 174) supports the proposed media processing format defined in the auto-negotiation data structure(s) 202. If, in block 504, the proposed media processing format is not supported by one or more of the media processing elements (e.g., accelerator(s) 174), the issuing media processing element generates a new auto-negotiation data structure(s) 202 reflecting an alternate media processing configuration, block 506. In particular, decoder 160 moves to another supported media processing format and generates a ConnectMode and ConnectConfig commands reflecting the proposed media processing format. According to one implementation, decoder 160 initiates the auto-negotiation process by proposing decoding in accordance with the MPEG-2 format.

If, in block 504, the media processing format is accepted, API 104 dynamically selects one or more operational data structure(s) 204 appropriate to facilitate media processing among and between the media processing elements in accordance with the negotiated format, block 508. In particular, API 104 selects picture parameters and buffer structures appropriate to facilitate the particular media processing format agreed upon by the media processing elements (e.g., the decoder 160 and accelerator 174).

In block 510, API 104 facilitates multimedia decoding among and between the media processing elements utilizing the dynamically selected operational data structure(s) 204 until the media processing has been completed. Thus, API 104 identifies the media processing capability of the various media processing system elements, and facilitates decoding among and between these elements without a priori knowledge of the particular elements used. In this regard, API 104 is a ubiquitous multimedia API insofar as it facilitates communication between any decoder application and any multimedia accelerator.

Figure 6:
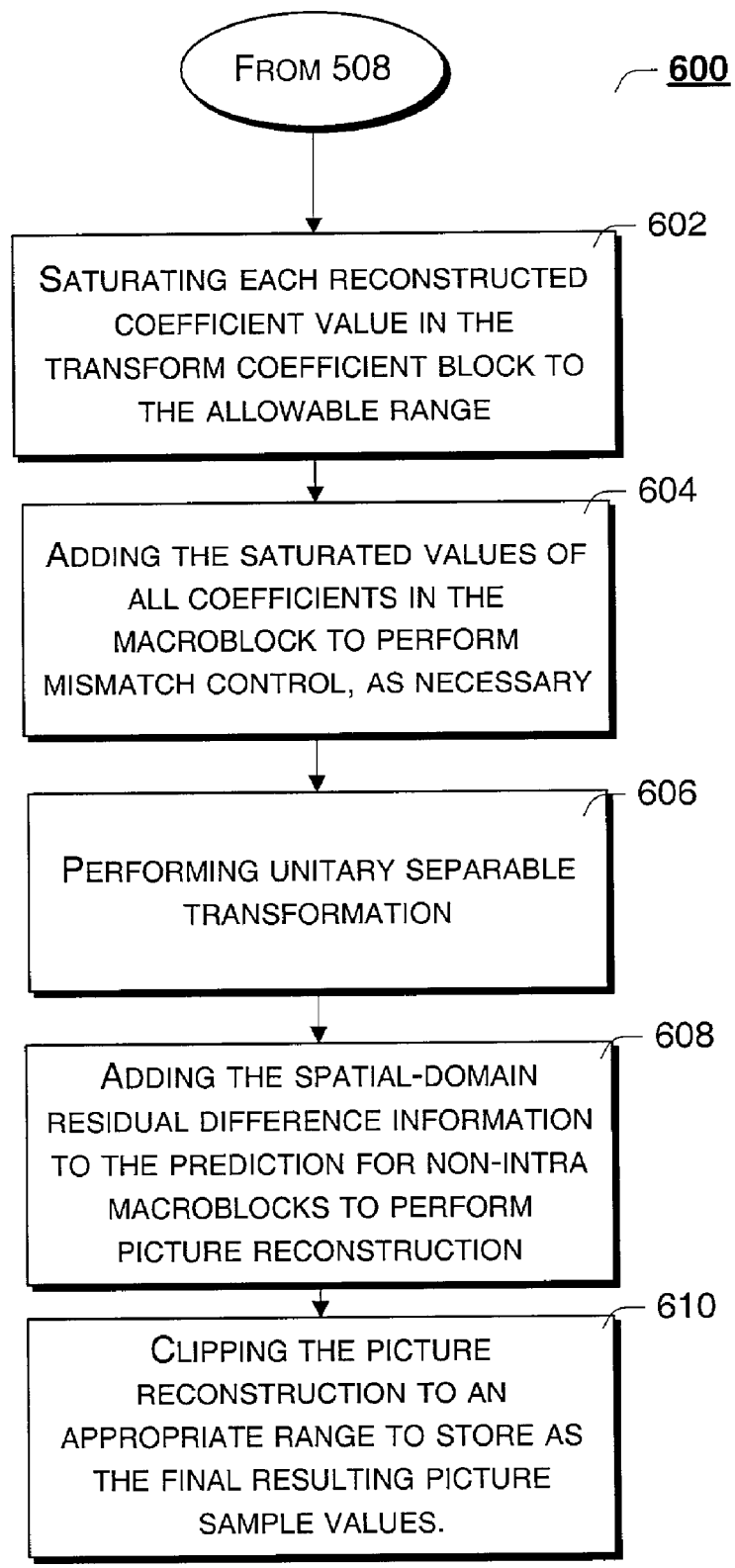
FIG. 6 is a flow chart of an example method of decoding media content, according to one example implementation of the present invention.

FIG. 6 is a flow chart of an example method of decoding media content, according to one example implementation of the present invention. In accordance with the illustrated example implementation of FIG. 6, the method begins once the decoding format has been negotiated between the media processing system elements, e.g., decoder(s) 160, accelerator(s) 174, etc. (block 504). The decoding process of FIG. 6 begins with block 602 by saturating each reconstructed coefficient value in the transform coefficient block to an allowable range. As introduced above, this is commonly performed by the decoder application 160. Once the saturation is complete, the saturated values are added to the coefficients in the macroblock to perform mismatch control, as necessary, block 604. As alluded to above, mismatch control may be necessary in MPEG-2 decoding.

In block 606, unitary separable transformation is performed. This transformation may well be performed by the decoder application 160 on the host, or by the accelerator 174. According to one innovative aspect of API 104, a determination is made during the auto-negotiation process as to which element will perform the transformation.

In block 608, the spatial domain residual difference information is added to the prediction for non-intra macroblocks to perform picture reconstruction. This task is typically performed off-host, i.e., at the accelerator(s) 174.

In block 610, the accelerator 174 performs a clipping operation to clip the picture reconstruction to an appropriate range to store as the final resulting picture sample values.

Figure 7:
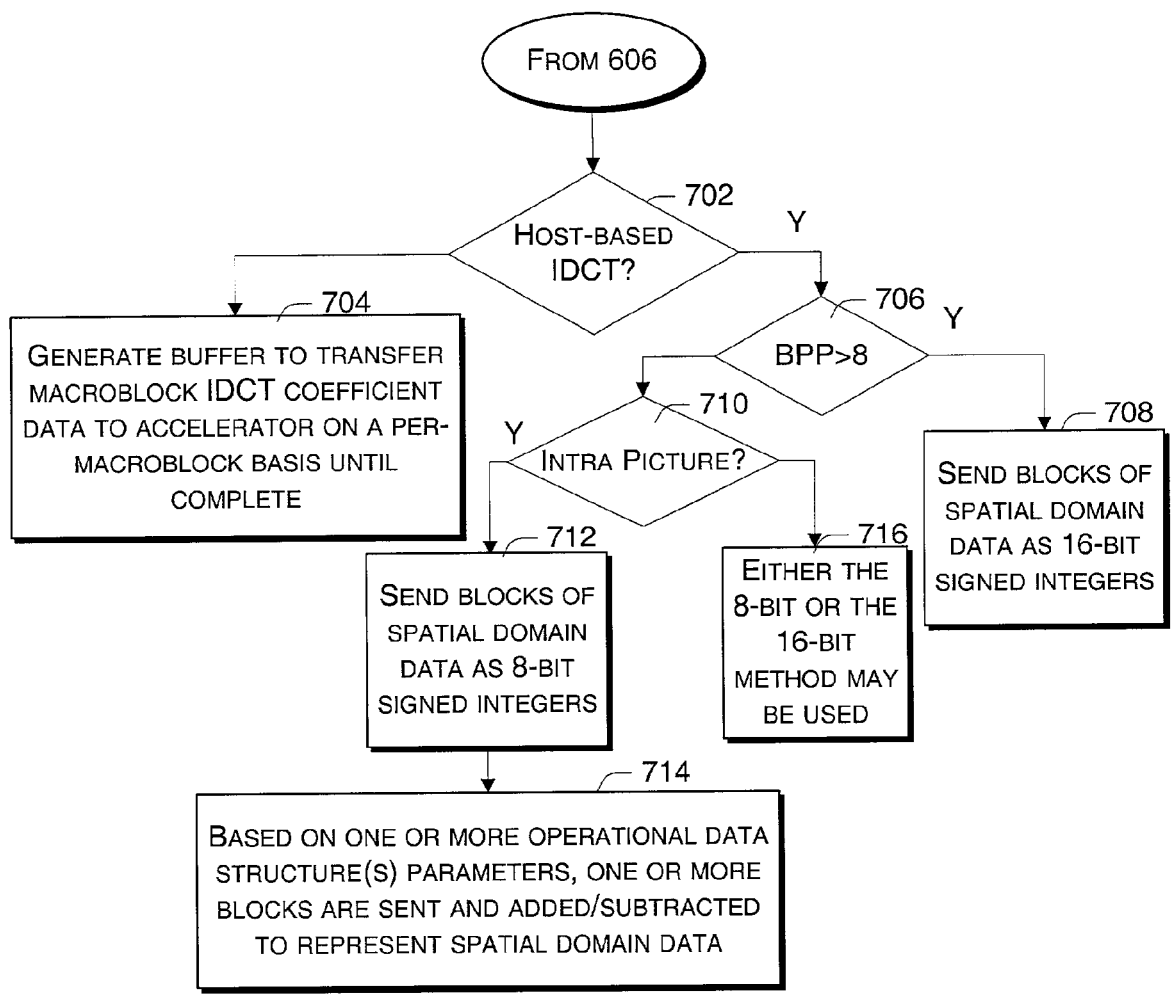
FIG. 7 is a flow chart of an example method facilitating host-based entropy decoding, according to one aspect of the present invention.

FIG. 7 is a flow chart of an example method facilitating host-based inverse discrete cosine transform (IDCT), according to one aspect of the present invention. In accordance with the illustrated example embodiment of FIG. 7, the method is begins with block 702 a determination is made as to whether the IDCT process will be performed on the host (e.g., by decoder 160), or on the accelerator 174. If the IDCT is performed by the accelerator, a buffer structure is established in operational data structure(s) 204 of API 104 to transfer macroblock IDCT coefficient data to the accelerator on a per-macroblock basis in support of the transform, block 704. This process is continued until all of the macroblocks have been processed.

If the IDCT is to be performed on the host, a first determination is made whether the BPP value is greater than 8 bits, block 706. If so, the spatial domain data resulting from the IDCT process performed by the decoder 160 will be transferred to the accelerator 174 for further processing (i.e., reconstruction, clipping, etc.) as 16-bit signed integers, block 708.

If, in block 706, BPP is not greater than 8-bits, a further determination is made whether the current picture is an intra-picture, block 710. If so, the spatial domain data will be represented as 8-bit signed integers, block 712. In block 714, based on one or more operational data structure(s) 204 parameters, one or more 8-bit blocks of data are sent for each macroblock and added or subtracted to represent the spatial domain data. More specifically, as introduced above, API 104 facilitates an innovative means of transferring spatial domain data in 8-bit increments using the 8-bit difference method. The determination of whether one or two blocks is required, and whether the blocks are to be added or subtracted depends on the PicResid8Subtraction, PicOverflowBlocks, PC_Overflow and IntraMacroblock settings of operational data structure(s) 204. A table summarizing the settings and result is provided, below.

Effect of 8-bit Spatial Differences

| PicOverflowBlocks | PicResid8Subtraction | First Pass Effect | Overflow Pass Effect (Not Allowed if Intra) |
|---|---|---|---|
| 0 | 0 | added | N/A |
| 0 | 1 | subtracted (no intra | N/A |
| 1 | 0 | added | added |
| 1 | 1 | added | subtracted |

Deblocking Filter Control

Figure 8:
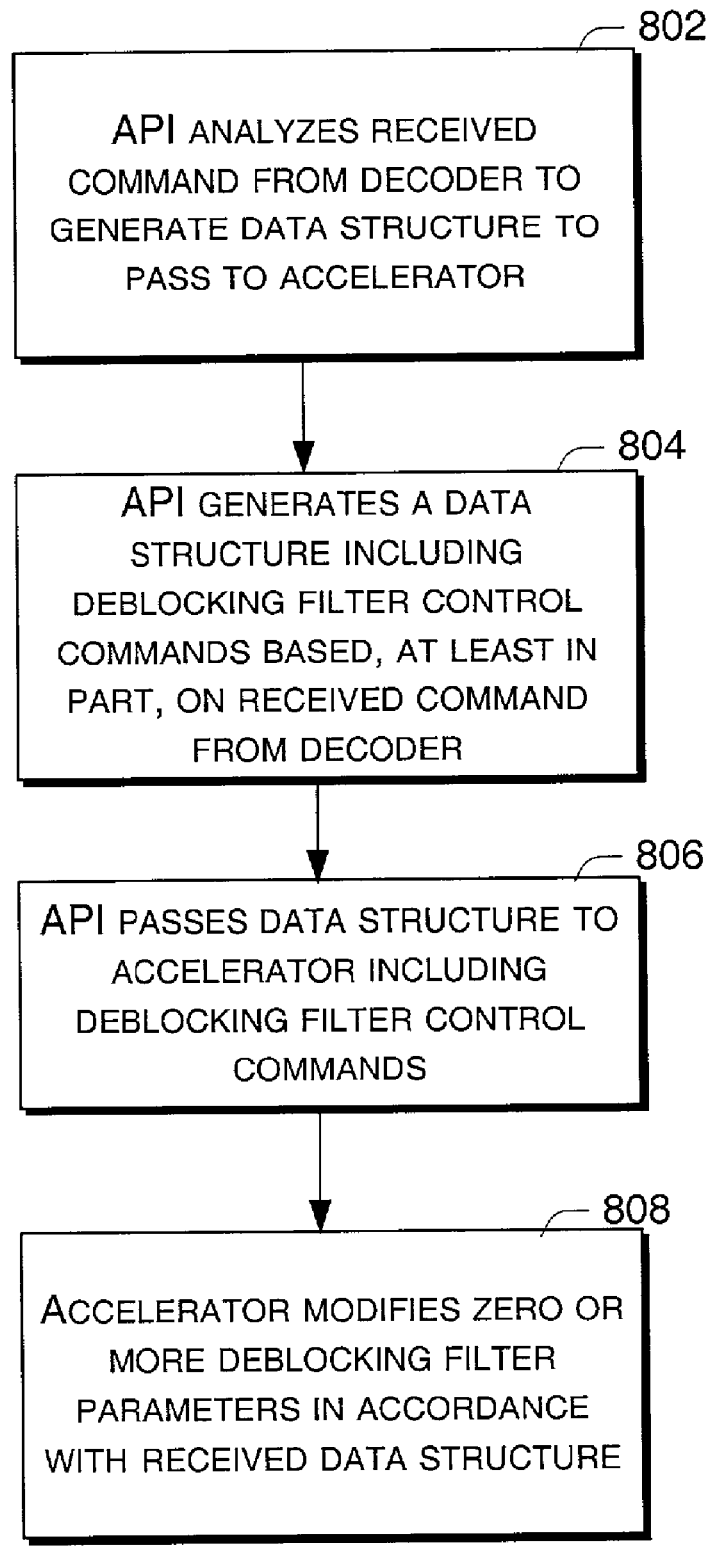
FIG. 8 is a flow chart of an example method facilitating application control of an accelerator deblocking filter, in accordance with one aspect of the present invention.

Turning to FIG. 8, API 104 facilitates control of a deblocking filter on an accelerator 174 by the decoder 160, according to one aspect of the present invention. In accordance with the illustrated example implementation, API 104 assesses received commands for deblocking filter control commands, block 802. If deblocking filter control commands are recognized within a command received from decoder 160, API 104 generates operational data structure(s) 204 including instructions which, when received by the accelerator 174, will affect one or more deblocking filter settings, block 804. In block 806, deblocking filter control commands if present within operational data structure(s) 204, are sent for each luminance block in a macroblock and are sent once for each pair of chrominance blocks. According to one implementation, the commands are sent in raster scan order within the macroblock, with all blocks for luminance sent before any blocks for chrominance, then one chrominance 4:2:0 command, then one chrominance 4:2:2 command if needed, then two chrominance 4:4:4 commands if needed (the same filtering is applied to both chrominance components). According to one implementation, the filtering for each block is specified by specification of the deblocking to occur across its top edge, followed by specification of the deblocking to occur across its left edge. Deblocking is specified for chrominance only once—and the same deblocking commands are used for both the Cb and Cr components. For example, deblocking of a 16×16 macroblock which contains 4:2:0 data using 8×8 blocks is specified by sending four (4) sets of two (one top and one left) edge filtering commands for the luminance blocks, followed by one set of two edge filtering commands for the chrominance. In response, to receiving such a data structure, accelerator 174 modifies zero or more deblocking filter attributes, in accordance with the received deblocking filter commands, block 808. An example data structure to effect deblocking filter commands within operational data structure 204 is provided as:

```
deblocking_edge_control {
    DXVA_filterOn
    STRENGTH
}
```

DXVA_filterOn: This flag shall be '1' if the edge is to be filtered;

STRENGTH: This parameter specifies the strength of the filtering to be performed. According to one implementation, the strength values are adopted from H.263 Annex J.

Alternate Implementations

Figure 9:
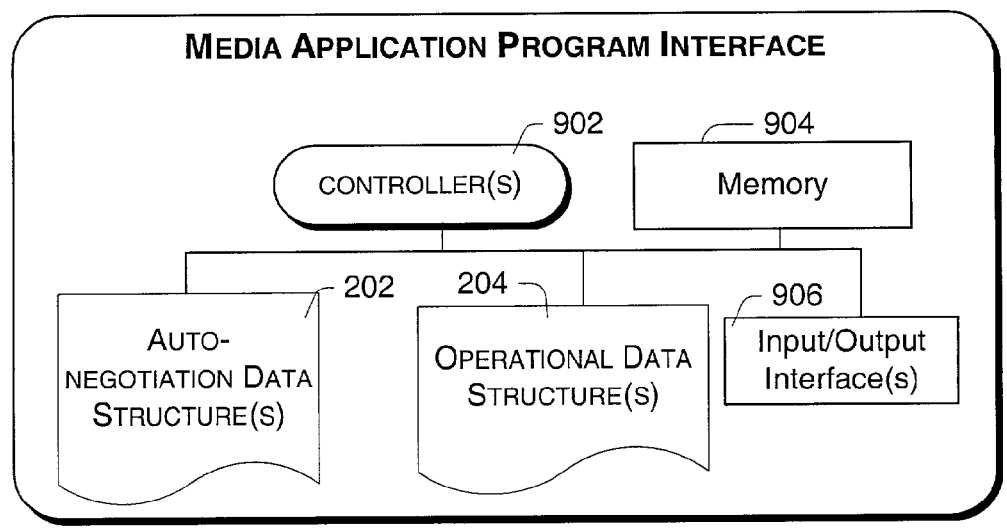
FIG. 9 is a block diagram of an example multimedia API, according to an alternate implementation of the present invention.

FIG. 9 illustrates a block diagram of a media application program interface (API) according to an alternate embodiment of the present invention. According to the illustrated example embodiment of FIG. 9, in addition to auto-negotiation data structure(s) 202 and operational data structure(s) 204, API 900 includes control logic 902, memory resources 904 and input/output (I/O) interface facilities 906, each coupled as shown. According to this alternate embodiment, control logic 902 dynamically generate auto-negotiation data structure(s) 202, which are sent to one or more media processing elements via I/O interface 906 to negotiate the media processing capability of one or more media processing elements of a media processing system. According to one implementation, a number of media processing formats are retained in memory 904 for use in generating the auto-negotiation data structure(s) 202. In one implementation, control logic 902 accesses communicatively coupled resources for media processing formats with which to generate auto-negotiation data structure(s) 202. Control logic 902 iteratively issues auto-negotiation data structure(s) 202 until the elements of the media processing system have agreed upon a media processing format and division of media processing responsibility.

Once a processing format has been agreed upon, control logic 902 selects one or more operational data structure(s) 204 to facilitate further media processing among and between media processing elements, in accordance with the agreed upon format.

Figure 10:
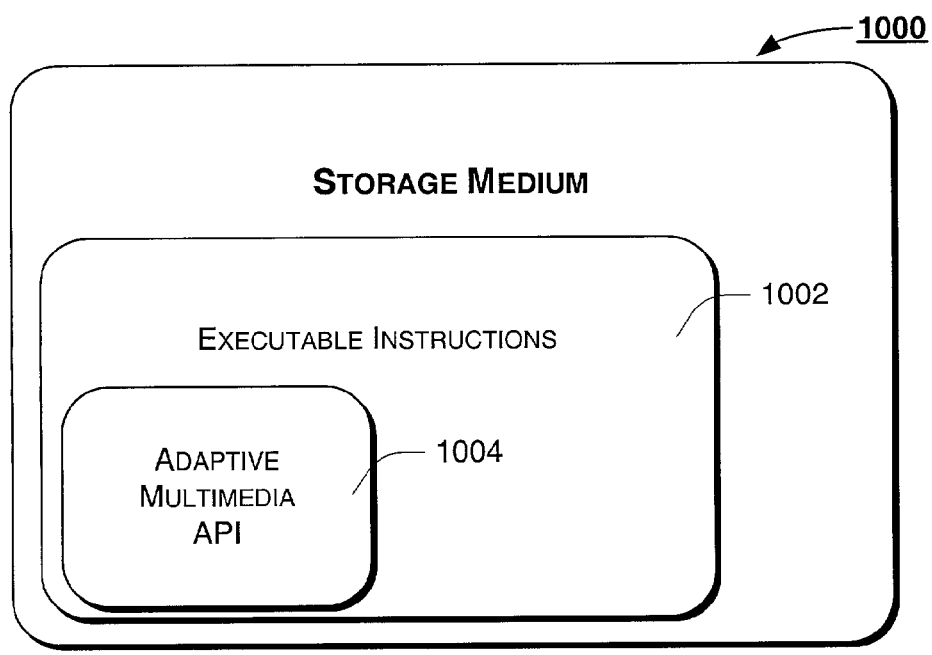
FIG. 10 is a block diagram of an example storage medium comprising a plurality of executable instructions that when executed implement the multimedia API of the present invention, according to one embodiment of the present invention.

Turning next to FIG. 10, a block diagram of a storage medium having stored thereon a plurality of instructions including instructions which, when executed, implement the teachings of the present invention, according to yet another embodiment of the present invention. In general, FIG. 10 illustrates a storage medium/device 1000 having stored thereon a plurality of executable instructions 1002 including at least a subset of which that, when executed, implement the adaptive API 104 of the present invention. When executed by a processor (132) of a host system (100), the executable instructions implementing API 104 identify and characterize the processing capability of a multimedia processing system, and dynamically adjusts one or more operational settings to operatively interface any decoder application with any multimedia accelerator. In this regard, API 104 is an extensible, universal multimedia API. According to one implementation, API 104 selectively modifies one or more operational settings to improve multimedia processing performance of the host system (100) based, at least in part, on the identified functional capability of the one or more elements of the multimedia processing system.

As used herein, storage medium 1000 is intended to represent any of a number of storage devices and/or storage media known to those skilled in the art such as, for example, volatile memory devices, non-volatile memory devices, magnetic storage media, optical storage media, and the like. Similarly, the executable instructions are in machine language, interpreted languages, and/or other source code that will be interpreted, such as, for example, C, C++, Visual Basic, Java, Smalltalk, Lisp, eXtensible Markup Language (XML), and the like. Moreover, it is to be appreciated that the storage medium/device 1000 need not be co-located with any host system. That is, storage medium/device 1000 may well reside within a remote server communicatively coupled to and accessible by an executing system. Accordingly, the software implementation of FIG. 10 is to be regarded as illustrative, as alternate storage media and software embodiments are anticipated within the spirit and scope of the present invention.

Although the invention has been described in language specific to structural features and/or methodological acts, it is to be understood that the invention defined in the appended claims is not necessarily limited to the specific features or steps described. Rather, the specific features and steps are disclosed as example forms of implementing the claimed invention.

The invention claimed is:

1. A method comprising:
    receiving a command from a decoder application at an application program interface (API), wherein the API is configured to facilitate the use of a plurality of different multimedia accelerators with the decoder application; and
    generating one or more filter control command data structures, recognizable by a communicatively coupled accelerator including one or more parameters which, when received by the accelerator, affects one or more filter settings of the accelerator based, at least in part, on the content of the received command.

2. A method according to claim 1, further comprising:
    passing the generated filter control command data structures to the accelerator, wherein the accelerator modifies one or more filter settings in accordance with the parameters embedded within the data structure.

3. A method according to claim 1, wherein the filter is a post-processing filter.

4. A method according to claim 3, wherein output data subsequent to the application of a post-processing filter are used as prediction references for decoding subsequent data.

5. A method according to claim 3, wherein the post-processing filter is one or more of a deblocking filter and a de-ringing filter.

6. A method according to claim 1, wherein the parameters include a strength parameter.

7. A method according to claim 6, wherein the generated data structure includes a strength parameter for each of one or more block boundaries of a frame.

8. A method according to claim 1, wherein the API issues filter control commands for each of a number of edges of luminance and chrominance blocks of received media content.

9. A method according to claim 1, wherein the API issues macroblock filter control command data structures for each macroblock of video picture content, each macroblock filter control command comprising four (4) or sixteen (16) luminance block filter control command data structures for controlling the filtering of the luminance blocks of the macroblock, and/or two (2), four (4), eight (8), sixteen (16), or thirty-two (32) chrominance block filter control command data structures for controlling the filtering of the chrominance blocks of the macroblock.

10. One or more computer-readable storage media having computer-readable instructions stored thereon which, when executed by a computer, implement a method according to claim 1.

11. A system comprising:
    one or more computer-readable storage media; and
    computer-readable instructions on the one or more computer-readable storage media which, when executed by one or more processors, implement a method according to claim 1.

12. One or more computer-readable storage media having computer-readable instructions stored thereon which, when executed by a computer, implement an application program interface (API) to dynamically generate one or more filter control command data structures in response to a command received from a decoder application, wherein the one or more filter control command data structure(s) include one or more parameters which, when received by a communicatively coupled accelerator, effect one or more filter settings on the accelerator in accordance with the received command, wherein the API is not specific to any particular multimedia application and/or multimedia accelerator.

13. A storage medium according to claim 12, wherein the filter control command data structure(s) effect one or more post processing filter(s) of the accelerator.

14. A storage medium according to claim 12, wherein the filter control command data structure(s) effect one or more of a deblocking filter(s), de-ringing filter(s), and/or another post processing filter of the accelerator.

15. A storage medium according to claim 12, wherein the API issues a fitter control command data structure for each of a number of edges of luminance and chrominance blocks of received media content.

16. A storage medium according to claim 15, wherein the API issues four (4) filter control command data structures for each luminance block, and/or two (2) filter control command data structure(s) for each chrominance block.

17. A storage medium according to claim 12, wherein the parameter(s) include a filter strength parameter.

18. A computing system comprising:
    a decoder application to process received media content; and
    an operating system including an application program interface (API), support the media processing, wherein the API generates one or more filter control commands including one or more parameters which, when received by a communicatively coupled media processing accelerator, effect one or more filter settings of the accelerator in accordance with a command received from the decoder, wherein the decoder application is configured to iteratively issue configuration commands reflecting various alternative degrees and methods of decoding acceleration capability until choosing one tat is acceptable to both the decoder application and the accelerator.

19. A computing system according to claim 18, further comprising:
    one or more media processing accelerator(s), communicatively coupled to the decoder application via the API, including one or more filter(s) responsive to the filter control command data structures reflecting information received in the command from the decoder.

20. A computing system according to claim 19, wherein the filter(s) are post processing filters.

21. A computing system according to claim 19, wherein the filter(s) include one or more of a deblocking filter and de-ringing filter.

22. A computing system according to claim 18, wherein the API issues macroblock filter control command data structures for each macroblock of video picture content, each macroblock filter control command comprising four (4) or sixteen (16) luminance block filter control command data structures for controlling the filtering of the luminance blocks of the macroblock, and/or two (2), four (4), eight (8), sixteen (16) or thirty-two (32) chrominance block filter control command data structures for controlling the filtering of the chrominance blocks of the macroblock.

23. A computing system according to claim 18, wherein the filter control command data structures include a strength parameter to control an amount of filter applied by a receiving filter.

24. A computing system according to claim 18, further comprising:
   a storage medium having stored therein a plurality of executable instructions; and
   an execution unit, coupled to the storage medium, to execute at least a subset of the plurality of executable instructions to implement the operating system and associated API.

25. A computing system according to claim 24, wherein the execution unit executes at least a subset of the plurality of executable instructions to implement the decoder application.

* * * * *

UNITED STATES PATENT AND TRADEMARK OFFICE
CERTIFICATE OF CORRECTION

PATENT NO. : 7,634,011 B2  Page 1 of 1
APPLICATION NO. : 09/839679
DATED : December 15, 2009
INVENTOR(S) : Gary J. Sullivan It is certified that error appears in the above-identified patent and that said Letters Patent is hereby corrected as shown below:

In column 29, line 22, above "Deblocking Filter Control" insert -- 1. When IntraMacroblock = 1, no overflow blocks are present. 2. When PicOverflowBlocks = 0 and PicResid8Subtraction = 1, IntraMacroblock shall be O. If, in block 710, the current picture is not an intra-picture then either of the 16-bit or 8-bit communication methods may well be implemented, block 716, --.

In column 32, line 21, in Claim 15, delete "fitter" and insert -- filter --, therefor.

In column 32, line 44, in Claim 18, delete "tat" and insert -- that --, therefor.

Signed and Sealed this
Fifteenth Day of February, 2011

David J. Kappos
*Director of the United States Patent and Trademark Office*